United States Patent
Ito et al.

(10) Patent No.: US 7,190,525 B2
(45) Date of Patent: **\*Mar. 13, 2007**

(54) DIFFUSION FILM COMPRISING TRANSPARENT SUBSTRATE AND DIFFUSION LAYER

(75) Inventors: Yoji Ito, Minami-ashigara (JP); Isao Fujiwara, Minami-ashigara (JP); Takumi Ando, Minami-ashigara (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 197 days.

This patent is subject to a terminal disclaimer.

(21) Appl. No.: 10/490,642

(22) PCT Filed: Oct. 11, 2002

(86) PCT No.: PCT/JP02/10627

§ 371 (c)(1),
(2), (4) Date: Mar. 25, 2004

(87) PCT Pub. No.: WO03/034104

PCT Pub. Date: Apr. 24, 2003

(65) Prior Publication Data

US 2005/0063062 A1    Mar. 24, 2005

(30) Foreign Application Priority Data

Oct. 11, 2001  (JP) .............................. 2001-314403
Mar. 13, 2002  (JP) .............................. 2002-068595
Mar. 22, 2002  (JP) .............................. 2002-081870

(51) Int. Cl.
*G02B 5/02* (2006.01)

(52) U.S. Cl. .......................... 359/599; 349/64; 349/112

(58) Field of Classification Search ................. 359/599
See application file for complete search history.

(56) References Cited

U.S. PATENT DOCUMENTS

| | | | | |
|---|---|---|---|---|
| 5,963,284 A | * | 10/1999 | Jones et al. | 349/112 |
| 6,259,561 B1 | * | 7/2001 | George et al. | 359/566 |
| 6,343,865 B1 | | 2/2002 | Suzuki | 359/601 |
| 2003/0117707 A1 | * | 6/2003 | Uchida et al. | 359/492 |
| 2005/0030444 A1 | * | 2/2005 | Fujiwara et al. | 349/64 |
| 2005/0207016 A1 | * | 9/2005 | Ando | 359/586 |

FOREIGN PATENT DOCUMENTS

| | | |
|---|---|---|
| EP | 1083445 A | 3/2001 |
| JP | 10-293210 A | 11/1998 |
| JP | 11-030714 A | 2/1999 |
| JP | 11-305010 A | 11/1999 |
| JP | 11-326608 A | 11/1999 |
| JP | 2000-075132 A | 3/2000 |
| JP | 2000-121809 A | 4/2000 |
| JP | 2001-228333 A | 8/2001 |
| WO | WO 200273251 A1 * | 9/2002 |

\* cited by examiner

*Primary Examiner*—Arnel Lavarias
(74) *Attorney, Agent, or Firm*—Buchanan Ingersoll & Rooney PC

(57) ABSTRACT

A diffusion film includes a transparent substrate and a diffusion layer. The diffusion layer shows a specific scattered light profile measured by a goniophotometer. In the scattered light profile, a ratio of an intensity of scattered light at an angle of 30° to an intensity of transmitted light at an angle of 0° is 0.01 to 0.2%.

15 Claims, 3 Drawing Sheets

DIFFUSION FILM COMPRISING TRANSPARENT SUBSTRATE AND DIFFUSION LAYER

FIELD OF INVENTION

The present invention relates to a diffusion film comprising a transparent substrate and a diffusion layer. The invention also relates to an anti-reflection film comprising a transparent substrate, a diffusion layer and a low refractive index layer in this order. The invention further relates to a polarizing plate comprising a pair of protective films and a polarizing membrane provided between the films. The diffusion film, the anti-reflection film and the polarizing plate can be advantageously used in an image display device.

BACKGROUND OF INVENTION

A liquid crystal display generally comprises a polarizing plate and a liquid crystal cell. For ensuring the quality of displayed images, the viewing angle must be enlarged and the display surface (screen) must be prevented from reflecting light coming from outside.

The most widely used display is a TFT liquid crystal display of TN mode, in which an optical compensatory sheet is provided between the polarizing plate and the liquid crystal cell. As described in Japanese Patent Provisional Publication Nos. 8(1996)-50206, 7(1995)-191217 and European Patent No. 0911656A2, the TFT liquid crystal display of TN mode gives an image of high quality within a wide viewing angle range. However, gradation of an image displayed by the TFT liquid crystal display is often inverted when the screen is seen downward.

To solve the problem, various proposals have been given. For example, it has been proposed that a diffusing means (Japanese Patent No. 2,822,983), an optical axis-exchanger (Japanese Patent Publication No. 2001-33783) or an optical means for diffusing emitted light (Japanese Patent Publication No. 2001-56461) be provided on the observer side surface to improve the image quality remarkably. However, in these methods, it is necessary to use a diffusing means having highly controlled lens or diffraction grating structure, which costs a lot and is very difficult to mass-produce.

Japanese Patent Provisional Publication Nos. 6(1994)-18706 and 10(1998)-20103 disclose a diffusion film in which a transparent substrate is coated with a resin containing filler (e.g., silicone dioxide (silica)). That diffusion film can be mass-produced at low cost.

Japanese Patent Provisional Publication Nos. 11(1999)-160505, 11(1999)-305010, 11(1999)-326608, 2000-121809, 2000-180611 and 2000-338310 disclose other diffusion films, but they cannot fully improve the image quality.

Recently, liquid crystal displays have been often used as monitors of enough fine pixels to display minute images. However, the monitors equipped with the diffusion films often display blurred images.

For preventing the display surface from reflecting light coming from outside, an anti-reflection film is generally provided. The anti-reflection film is placed on the top surface of the display, and causes optical interference to reduce reflectance so that the display screen may be prevented from reflecting surrounding scenes and thereby so that the contrast of displayed image may not impaired. However, the anti-reflection film by no means solves the problem of viewing angle (inversion of gradation), and therefore it has been wanted to provide an anti-reflection film which prevents well the display surface from reflecting light coming from outside and at the same time which solves the problem of viewing angle.

SUMMARY OF INVENTION

It is an object of the present invention to enlarge the viewing angle of liquid crystal display, particularly to prevent the display surface from reflecting surrounding scenes and to prevent inversion of gradation when the display is seen downward.

It is another object of the invention to make a liquid crystal display give a clear image even if the display is used as the minutely displaying monitor.

It is a further object of the invention to enlarge the viewing angle (particularly, viewing angle when the display is seen downward) without thickening the liquid crystal panel.

It is a furthermore object of the invention to prevent image quality impairments, such as deterioration of contrast, inversion of gradation or inversion of black to white or white to black, and unfavorable variation of hue, which are often observed according to the viewing angle.

The present invention provides a diffusion film which comprises a transparent substrate and a diffusion layer, wherein the diffusion layer shows such a scattered light profile measured by a goniophotometer that a ratio of an intensity of scattered light at an angle of 30° to an intensity of transmitted light at an angle of 0° is 0.01 to 0.2%.

The diffusion layer can show such a scattered light profile measured by a goniophotometer that a ratio of an intensity of scattered light at an angle of 60° to an intensity of transmitted light at an angle of 0° is not more than 0.02%.

The diffusion layer can have a total haze value in the range of 40 to 90%. The diffusion layer can also have an internal diffusing haze value in the range of 30 to 80%. The diffusion layer can further have a haze value measured at an angle of 30° in the range of 30 to 95%.

The diffusion layer can comprise a transparent resin and transparent fine particles. The transparent fine particles can have a refractive index different from a refractive index of the transparent resin. The difference in the refractive index between the transparent resin and the transparent fine particles is preferably in the range of 0.02 to 0.20. The fine particles preferably comprise relatively small particles having a particle size in the range of 0.5 to 2.0 μm and relatively large particles having a particle size in the range of 2.5 to 5.0 μm.

The diffusion layer can have such a rough surface that an average angle in an angular distribution from the surface of the layer is in the range of 1.5 to 5°. The diffusion layer can also have such a rough surface that the maximum peak angle in an angular distribution from the surface of the layer is in the range of 0.4 to 1.4°. The diffusion layer can further have such a rough surface that a surface roughness is in the range of 0.05 to 0.18 μm.

The transparent substrate can be an optically anisotropic polymer film. The optically anisotropic polymer film preferably has a Re retardation value in the range of 0 to 200 nm, and preferably has a Rth retardation value in the range of 70 to 500 nm.

The invention also provides a polarizing plate comprising a pair of protective films and a polarizing membrane provided between the protective films, wherein one of the protective films is the diffusion film defined above.

The polarizing plate can further comprise an optically anisotropic layer comprising a liquid crystal compound, and the plate comprises the diffusion film, the polarizing membrane and the optically anisotropic layer in this order.

The liquid crystal compound preferably is a discotic compound.

The invention further provides an anti-reflection film which comprises a transparent substrate, a diffusion layer and a low refractive index layer in this order, wherein the diffusion layer shows such a scattered light profile measured by a goniophotometer that a ratio of an intensity of scattered light at an angle of 30° to an intensity of transmitted light at an angle of 0° is 0.01 to 0.2%, and wherein an average mirror reflectance of incident light at an angle of 5° is not more than 2.5% in the wavelength region of 450 to 650 nm.

The invention furthermore provides a polarizing plate comprising a pair of protective films and a polarizing membrane provided between the protective films, wherein one of the protective films is the anti-reflection film defined above.

The diffusion film, the anti-reflection film or the polarizing plate can be attached to a display surface of an image display device. The image display device is preferably a liquid crystal display. The liquid crystal display preferably has a liquid crystal cell of a TN, VA, OCB, IPS or ECB mode.

The present inventors have found that the distribution of scattered light intensity measured by a goniophotometer correlates with improvement of the viewing angle character. The inventors have further found that an anti-reflection film having a proper haze value and comprising a particular low refractive index layer both improves the viewing angle character and prevents the display surface from reflecting light coming from outside without blurring the displayed image.

Light emitted from the backlight is diffused by the diffusion film provided on the polarizing plate of the observer side. The more the light is diffused, the more the viewing angle character is improved. However, if the light is diffused too much, the amount of light scattered backward is so increased that the brightness of the image seen frontally is decreased or that the clearness of the image is impaired. Therefore, it is necessary to control the distribution of scattered light intensity in a particular range.

The inventors have revealed that the desired viewing character can be realized if the ratio of the scattered light intensity at the scattering angle of 30° per the light intensity at 0° in a scattered light profile is controlled within a particular range. The inventors have further found that it is preferred to control the scattered light intensity at the scattering angle of 60° (which correlates with blurring of the image) in order to ensure clearness of the displayed image.

Consequently, according to the present invention, the viewing angle of liquid crystal display is enlarged. In particular, the display surface is prevented from reflecting surrounding scenes. At the same time, inversion of gradation when the display is seen downward is also prevented.

Also according to the invention, a liquid crystal display gives a clear image even if the display is used as a minutely displaying monitor.

Further according to the invention, the viewing angle (particularly, viewing angle when the display is seen downward) is enlarged without thickening the liquid crystal panel.

Furthermore, the diffusion film can prevent image quality impairments, such as deterioration of contrast, inversion of gradation or inversion of black to white or white to black, and unfavorable variation of hue, which are often observed according to the viewing angle.

DETAILED DESCRIPTION OF INVENTION

Figure 1:
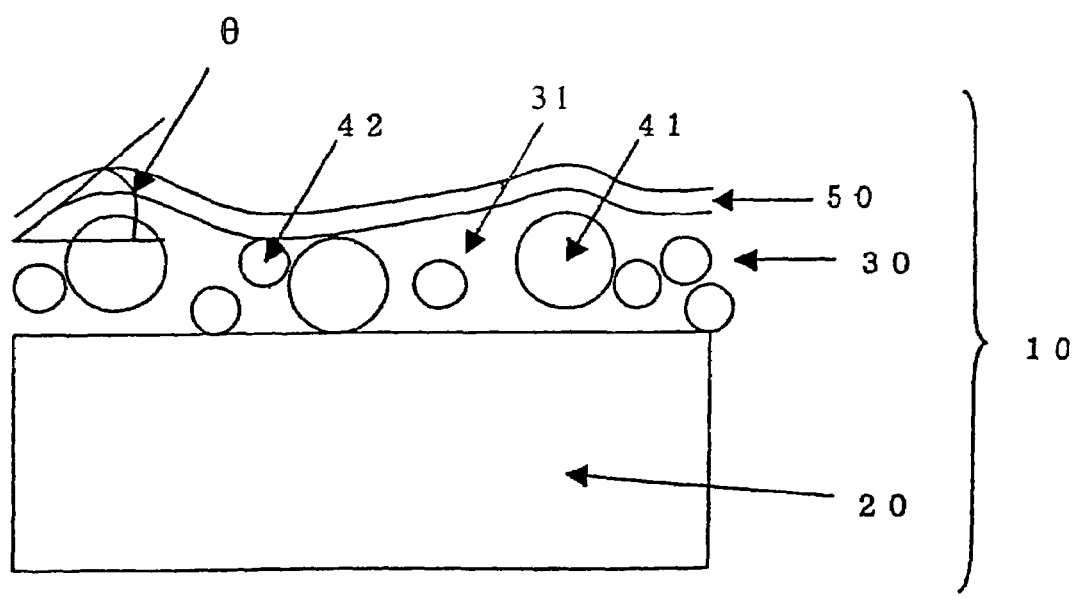
FIG. 1 is a sectional view schematically illustrating a basic structure of the diffusion film.

In the present invention, the ratio of the scattered light intensity at the scattering angle of 30° per the light intensity at 0° in a scattered light profile is controlled within the range of 0.01 to 0.2%, preferably 0.02 to 0.15%, more preferably 0.03 to 0.1%, in order to realize the desired viewing character. The scattered light intensity at the scattering angle of 30° closely correlates with improvement of the viewing angle character.

Also in order to ensure clearness of the displayed image, it is preferred to control the scattered light intensity at the scattering angle of 60° (which closely correlates with blurring of the image). The ratio of the scattered light intensity at the scattering angle of 60° per the light intensity at 0° in a scattered light profile is controlled at preferably 0.02% or less, more preferably 0.01% or less, and most preferably 0.005% or less.

The scattered light profile can be obtained by measuring the prepared diffusion film by means of a commercially available automatic goniophotometer (GP-5, Murakami Color Research Laboratory).

In order to improve the viewing angle character, it is also important to control the haze value. The internal diffusing haze value is preferably in the range of 30 to 80%, more preferably in the range of 35 to 70%, most preferably in the range of 40 to 60%.

The internal diffusing haze can be enhanced by increasing the amount of fine particles having a mean particle size of 0.5 to 2.0 μm, by thickening the film, or by increasing the refractive index of the particles.

The surface roughness can give an adequate surface haze to improve visibility. The resultant haze value (total of the internal scattering haze and the surface haze) is preferably in the range of 40 to 90%, more preferably in the range of 45 to 80%, and most preferably in the range of 50 to 70%.

The diffusion layer can further have a haze value measured at an angle of 30° preferably in the range of 30 to 95%, and more preferably in the range of 35 to 70%.

The anti-glare function (of preventing reflection of outside light) relates to a surface roughness. It has generally known that the reflection decreases as the roughness increases. The applicants have found that an average angle or the maximum peak angle in an angular distribution from the rough surface closely relates to the anti-glare function. Accordingly, the anti-glare function can be improved by adjusting the average angle or the maximum peak angle even if the surface roughness is small. The film having a rough surface has an anti-glare function but also display a vague or whitish image. According to the present invention, the film can have an anti-glare function without causing the problems.

The diffusion layer preferably has such a rough surface that an average angle in an angular distribution from the surface of the layer is in the range of 1.5 to 5°, and more preferably in the range of 2 to 4.5°. The diffusion layer can also have such a rough surface that the maximum peak angle in an angular distribution from the surface of the layer is in the range of 0.4 to 1.4°, and more preferably in the range of 0.5 to 1.2°. The diffusion layer further preferably has such a rough surface that a surface roughness is in the range of 0.05 to 0.18 μm. The surface roughness is preferably not more than 0.16 μm, and more preferably not more than 0.14 μm.

The angle in the angular distribution from the surface of the layer can be measured by means of a micro map software (Surface Explore SX-520 system, Ryoka Systems Inc.) having an interference microscope (MM-40/6, Nikon Corporation) using a double bean interference objective lens, a halogen lump and a CCD camera of 640×480.

(Basic Structure of Diffusion Film)

FIG. 1 is a sectional view schematically illustrating a basic structure of the diffusion film.

The diffusion film (10) shown in FIG. 1 comprises a transparent substrate (20), a diffusion layer (30) and a low refractive index layer (50), piled up in order. The diffusion layer (30) comprises a transparent resin (31) and therein-dispersed first transparent fine particles (41) and second transparent fine particles (42). The diffusion layer (30) may consist of plural sub-layers. Three or more kinds of transparent fine particles may be incorporated.

The transparent resin (31) in the diffusion layer (30) has a refractive index preferably in the range of 1.51 to 2.00. The refractive index of the low refractive index layer (50) is preferably in the range of 1.35 to 1.45. The transparent substrate (20) is preferably made of cellulose triacetate having the refractive index of 1.48.

The diffusion layer having a high refractive index prevents reflection well even if the low refractive index layer has a refractive index of 1.35 to 1.45. If the refractive index of the diffusion layer is too small, the layer cannot prevent reflection well. On the other hand, if it is too high, the reflected light is unfavorably colored.

The angle (θ) in FIG. 1 means the angle in the angular distribution from the surface of the layer.

Figure 2:
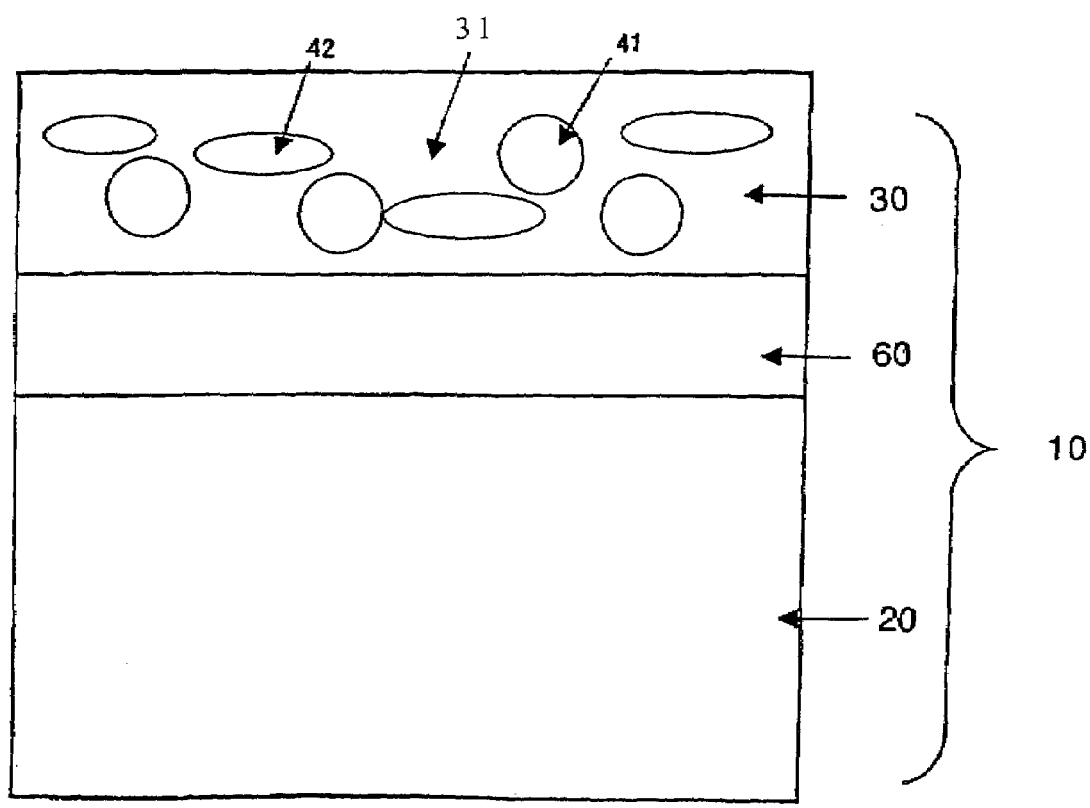
FIG. 2 is a sectional view schematically illustrating another basic structure of the diffusion film.

FIG. 2 is a sectional view schematically illustrating another basic structure of the diffusion film.

The diffusion film (10) shown in FIG. 2 comprises a transparent substrate (20), an optically anisotropic layer (60) and a diffusion layer (30) in this order. The diffusion layer (30) comprises a transparent resin (31) and first transparent fine particles (41) and second transparent fine particles (42).

The transparent substrate (20) can be made of a optically anisotropic polymer film. The optically anisotropic polymer film preferably is a cellulose acetate film, and more preferably is a cellulose triacetate film.

An orientation layer is preferably provided between the transparent substrate (20) and the optically anisotropic layer (60).

In the case that the diffusion film is attached to a liquid crystal display, a diffusion layer (rather than a transparent substrate) is arranged on the side of a liquid crystal cell. The diffusion film is preferably between the liquid crystal cell and a polarizing plate, and more preferably between the cell and the plate of a viewing side. The liquid crystal display preferably comprises (1) a transparent protective film, (2) a polarizing membrane, (3) a transparent substrate (an optically anisotropic polymer film), (4) an orientation layer, (5) an optically anisotropic layer, (6) a diffusion layer and (7) a liquid crystal cell in this order. The transparent protective film can have an anti-glare function or an anti-reflection function. An anti-glare film or an anti-reflection film is commercially available (CV Film, Fuji Photo Film Co., Ltd.).

(Diffusion Layer)

The diffusion film comprises a transparent resin and transparent fine particles, by which the scattered light profile and the haze value are controlled. At least two kinds of transparent fine particles having different particle sizes are preferably used in the invention.

The difference of refractive index between the particles and the transparent resin is preferably in the range of 0.02 to 0.20. If the difference is less than 0.02, it is too small for the film to diffuse light. If the difference is more than 0.20, light is so diffused that the whole film is whitened and opaqued. The refractive index difference is preferably in the range of 0.03 to 0.15, more preferably in the range of 0.04 to 0.13.

The transparent fine particles (42) have a mean particle size of 0.5 to 2.0 μm. Such particle size gives proper angular distribution of light scattering.

In order to improve the image quality (to improve the viewing angle character when the display is seen downward), it is necessary to diffuse incident light in a certain degree. The more the incident light is diffused, the more the viewing angle character is improved. On the other hand, for keeping brightness of the image seen frontally, it is necessary to increase the transparency as high as possible.

If the mean particle size is 0.5 μm or less, the incident light is scattered so much that the viewing angle character is remarkably improved. However, at the same time, the light is scattered backward so much that the brightness is considerably lowered. If the mean particle size is 2.0 μm or more, the incident light is scattered so little that the viewing angle character is insufficiently improved. Accordingly, the mean particle size of the fine particles is preferably in the range of 0.6 to 1.8 μm, more preferably in the range of 0.7 to 1.7 μm.

The other transparent fine particles (41) have a mean particle size of 2.5 to 5.0 μm. Such particle size gives surface scattering proper to the invention.

In order to improve the image quality, it is also necessary to prevent the display surface (screen) from reflecting surrounding scenes.

The lower haze value the display surface has, the clearer image the display gives. However, if the haze value is too low, surrounding scenes are reflected and sparkles (scintillations) are observed. If the haze value is too high, the display surface is whitened. Accordingly, the haze value ($h_s$) of the display surface satisfies the condition of preferably $0.5 < h_s < 30$, more preferably $3 \leq h_s \leq 20$, most preferably $7 \leq h_s \leq 15$.

The fine particles make the surface of the film (display surface) rough so adequately that the haze value may be in the above range. The haze value can be determined by means of a measuring apparatus (HR-100, Murakami Color Research Laboratory) according to JIS-K-7105.

If the mean particle size is 2.5 μm or less, the surface toughness is so little that incident light is not enough scattered to prevent the surface from reflecting surrounding scenes. If it is 5.0 μm or more, although the surface is rough enough to be prevented from reflecting surrounding scenes, the surface is remarkably whitened to impair the image quality. Accordingly, the mean particle size is preferably in the range of 2.2 to 4.7 μm, more preferably in the range of 2.4 to 4.5 μm.

The surface roughness (Ra) is preferably 1.2 μm or less, more preferably 0.8 μm or less, and most preferably 0.5 μm or less. The surface roughness can be measured by means of an atomic force microscope (SPI3800N, Seiko Instruments Inc.).

Since two or more kinds of transparent fine particles are mixed and used, the combination and mixing ratio can be freely selected to realize the optimum viewing angle character and to prevent the display surface from reflecting surrounding scenes.

The transparent fine particles (41) and (42) may be mono-dispersed organic or inorganic particles. The sizes of the particles are preferably uniform. If so, the scattering characters of the particles are almost the same, and accordingly the haze is easily controlled.

As the transparent fine particles, plastic beads are preferred. The plastic beads are preferably made of a material having high transparency, and the difference between the refractive index of the material and that of the transparent resin is preferably in the aforementioned range.

Examples of the material for the beads include polymethacrylate (refractive index: 1.49), acryl-styrene copolymer (refractive index: 1.54), melamine (refractive index: 1.57), polycarbonate (refractive index: 1.57), cross-linked polystyrene (refractive index: 1.61), polystyrene (refractive index: 1.60), polyvinyl chloride (refractive index: 1.60) and benzoguanamine-melamine formaldehyde (refractive index: 1.68).

Inorganic beads made of silica (refractive index: 1.44 to 1.45) and alumina (refractive index: 1.63) can be also used. Silica fine particles are preferred.

The shape of the beads should not be spherical. The aspect ratio of the beads is preferably in the range of 2 to 50, and more preferably in the range of 5 to 30 in the case that the diffusion layer preferably diffuse light at an inclined angle, in more detail that the diffusion layer preferably has a haze value measured at an angle of 30° in the range of 30 to 95%.

The size of the plastic beads is preferably in the range of 0.5 to 5 μm, as described above. The amount of the beads is preferably in the range of 5 to 30 weight parts per 100 weight parts of the transparent resin.

The surface roughness of the diffusion layer can be adjusted by controlling the particle size, the amount of the particle and the ratio of the transparent resin (binder) to the particle. The ratio essentially corresponds to the thickness of the diffusion layer. In the case that the particles have two or more peaks, the particles having the maximum peak relate to the surface roughness.

The relation between the particle size (dp) and the layer thickness (db) preferably satisfies the formula of $dp-1.0$ μm$\leq db \leq dp+1.5$ μm, and more preferably satisfies the formula of $dp-0.5$ μm $\leq db < dp+1.0$ μm. The amount of the particles based on the binder is preferably in the range of 1 to 15 wt. %, and more preferably in the range of 3 to 12 wt. % to satisfy the formula. The particle size is preferably in the range of 2.0 to 5.5 μm, and more preferably in the range of 2.5 to 5.0 μm. The surface roughness can be adjusted to small by increasing the ratio of the transparent resin (binder) to the particle to reduce particles projecting from the surface.

Since the transparent fine particles are liable to settle down in the resin composition (transparent resin), inorganic filler such as silica may be added to prevent the particles from settling. However, if it is too much added, the transparency of the film is impaired. Accordingly, the inorganic filler consisting of grains having sizes of 0.5 μm or less are preferably added in an amount of less than 0.1 wt. % based on the amount of the transparent resin. That amount of the filler hardly lowers the transparency.

The transparent resin is an ionization radiation (i.e., ultraviolet ray or electron beam)-setting resin, a mixture of ionization radiation-setting resin and thermoplastic resin in a solvent, or a thermosetting resin. The thickness of the diffusion film is normally in the range of 0.5 to 50 μm, preferably in the range of 1 to 20 μm, more preferably in the range of 2 to 10 μm, most preferably in the range of 3 to 7 μm.

The transparent resin has a refractive index preferably in the range of 1.51 to 2.00, more preferably in the range of 1.51 to 1.90, further preferably in the range of 1.51 to 1.85, most preferably in the range of 1.51 to 1.80. The refractive index of the diffusion layer is determined by measuring the layer without the transparent fine particles. If the refractive index is too small, the layer cannot prevent reflection well. On the other hand, if it is too high, the reflected light is unfavorably colored.

The transparent resin comprises a binder. The binder is preferably a polymer having a main chain of saturated hydrocarbon or polyether, and the polymer is preferably cross-linked. The polymer having the main chain of saturated hydrocarbon is preferably prepared from ethylenically unsaturated monomers through polymerization reaction. The monomer preferably has two or more ethylenically unsaturated groups to form a cross-linked polymer.

Examples of the monomer having two or more ethylenically unsaturated polymerizable groups include esters of polyhydric alcohol and (meth)acrylic acid (e.g., ethylene glycol di(meth)acrylate, 1,4-dichlorohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, 1,3,5-cyclohexanetriol trimethacrylate, polyurethane polyacrylate, polyester polyacrylate), vinylbenzene and derivatives thereof (e.g., 1,4-divinylbenzene, 4-vinylbenzoic acid-2-acryloyl ethylester, 1,4-divinylcyclohexanone), vinylsulfones (e.g., divinylsulfone), acrylamides (e.g., methylene bisacrylamide) and methacrylamide. In consideration of hardness and scratching resistance of the film, (meth)acrylate having five or more functional groups is preferred. A mixture of dipentaerythritol pentaacrylate and dipentaerythritol hexaacrylate is commercially available and particularly preferably used.

These monomers having ethylenically unsaturated polymerizable groups are dissolved in a solvent together with various polymerization initiators and additives. The thus-prepared solution (coating solution) is applied on a support, dried and polymerized to harden by ionization radiation or heat.

In place of or in addition to the monomers having two or more ethylenically unsaturated polymerizable groups, cross-linking groups may be introduced into the binder to be cross-linked. Examples of the cross-linking group include isocyanate group, epoxy group, aziridine group, oxa-zolidine group, aldehyde group, carbonyl group, hydrazine group, carboxyl group, methylol group, and active methylene group. Further, the cross-linked structure can be obtained by the monomers such as vinylsulfonic acid, acid anhydride, cyanoacrylate derivative, melamine, etherized methylol, ester, urethane, and methal alkoxide (e.g., tetramethoxy-silane). Furthermore, the binder may be cross-linked by decomposition of some monomers such as block-isocyanate group. As the cross-linking group, not only groups that immediately induce cross-linking reaction but also groups that are decomposed to cause the reaction can be used. The binder having the cross-linking group can be cross-linked by heating.

Besides the above binder polymer, the transparent resin comprises a copolymer of monomers having high refractive indexes and/or superfine particles of metal oxide having a high refractive index.

Examples of the monomers having high refractive indexes include bis(4-methacryloylthiophenyl)sulfide, vinylnaphthalene, vinylphenylsulfide, and 4-methacryloxyphenyl-4'-methoxyphenylthioether.

The metal oxide having a high refractive index is preferably an oxide of at least one metal selected from the group consisting of zirconium, titanium, aluminum, indium, zinc, tin and antimony. The size of the superfine particles is 100 nm or less, preferably 50 nm or less. Examples of the metal oxide include $ZrO_2$, $TiO_2$, $Al_2O_3$, $In_2O_3$, ZnO, $SnO_2$, $Sb_2O_3$ and ITO. Among then, $ZrO_2$ is particularly preferred. The amount of the superfine particles is in the range of 10 to 90 wt. %, preferably in the range of 20 to 80 wt. % based on the total amount of the transparent resin.

The diffusion layer containing the transparent resin is provided on the transparent substrate. For forming the layer, a solution of the resin is applied on the film. As a solvent of the solution, at least one solvent dissolving material of the substrate (e.g., cellulose triacetate) and at least one solvent not dissolving the material of the substrate are used in combination. That mixed solvent prevents the layer from glaring, and at the same time enhances the adhesion between the layer and the substrate. Preferably, at least one solvent not dissolving the substrate has a boiling point higher than at least one solvent dissolving the substrate. The highest boiling point of the solvents not dissolving the substrate is higher than the lowest boiling point of the solvents dissolving the substrate more preferably by 30° C. or more, most preferably by 50° C. or more.

Examples of the solvent dissolving the material of the substrate (preferably, cellulose triacetate) include ethers having 3 to 12 carbon atoms (e.g., dibutyl ether, dimethoxy methane, dimethoxy ethane, diethoxy ethane, propylene oxide, 1,4-dioxane, 1,3-dioxane, 1,3,5-trioxane, teterahydrofuran, anisole, phenetole), ketones having 3 to 12 carbon atoms (e.g., acetone, methyl ethyl ketone, diethyl ketone, dipropyl ketone, diisobutyl ketone, cyclopentanone, cyclohexanone, methyl cyclohexanone), esters having 3 to 12 carbon atoms (e.g., ethyl formate, propyl formate, n-pentyl formate, methyl acetate, ethyl acetate, methyl propionate, ethyl propionate, n-pentyl acetate, y-butyrolactone), organic solvents having two or more kinds of functional groups (e.g., methyl 2-methoxyacetate, methyl 2-ethoxyacetate, ethyl 2-ethoxyacetate, ethyl 2-ethoxypropionate, 2-methoxyehanol, 2-propoxyethanol, 2-butoxyethanol, 1,2-diacetoxyacetone, acetylacetone, diacetonealcohol, methyl acetoacetate, ethyl acetoacetate). These may be used singly or in combination. Ketones are preferred.

Examples of the solvent not dissolving the material of the substrate (preferably, cellulose triacetate) include methanol, ethanol, 1-propanol, 2-propanol, 1-butanol, 2-butanol, tert-butanol, 1-pentanol, 2-methyl-2-butanol, cyclohexanol, isobutyl acetate, methyl isobutyl ketone, 2-ocyanone, 2-pentanone, 2-heptanone, 3-pentanone, 3-heptanone, and 4-heptanone. These may be used singly or in combination.

The ratio (A/B) between the total amount (A) of the solvents dissolving material of the substrate and the total amount (B) of the solvents not dissolving that material is preferably in the range of 5/95 to 50/50, more preferably in the range of 10/90 to 40/60, most preferably in the range of 15/85 to 30/70.

The temperature of the layer between coating and drying is preferably in the range of 20 to 40° C.

The aforementioned composition of ionization radiation-setting resin can be hardened in the normal manner, namely, by irradiation of electron beams or ultraviolet rays. In the irradiation of electron beams, various electron accelerators such as Cockcroft-Walton accelerator, Van de Graaff accelerator, resonant transforming accelerator, insulating core-transforming accelerator, linear accelerator, dinamitron, and radio-frequency accelerator can be used. The electron beams have energy in the range of 50 to 1,000 KeV, preferably in the range of 100 to 300 KeV. In the irradiation of ultraviolet rays, various light sources such as extra high pressure mercury lamp, high pressure mercury lamp, low pressure mercury lamp, carbon arc lamp, xenon arc lamp, and metal halide arc lamp can be used.

(Low Refractive Index Layer)

A low refractive index layer as an anti-reflection layer is provided on the top surface of the diffusion layer side, to prevent the film from reflecting light coming from outside.

The low refractive index layer has a refractive index in the range of 1.35 to 1.45.

The refractive index of the low refractive index layer preferably satisfies the following formula (I):

$$(m\lambda/4) \times 0.7 < n_1 \times d_1 < (m\lambda/4) \times 1.3 \qquad \text{Formula (I):}$$

in which m is a positive odd number (usually 1), $n_1$ is the refractive index of the low refractive index layer, $d_1$ is the thickness (nm) of the low refractive index layer, and $\lambda$ is a wavelength of visible light in the region of 450 to 650 nm.

When the refractive index ($n_1$) satisfies the formula (I), a certain positive odd number (m) (which is usually 1) satisfying the formula (I) can be found in the above wavelength region.

The low refractive index layer can be made of a fluorine-containing resin prepared by hardening a thermosetting or ionization radiation-setting cross-linkable fluorine-containing compound. The thus-prepared layer has better scratch resistance than a low refractive index layer made of magnesium fluoride or calcium fluoride. The hardened fluorine-containing resin has a refractive index in the range of 1.35 to 1.45. The hardened fluorine-containing resin has a coefficient of kinetic friction preferably in the range of 0.03 to 0.15, and gives a contact angle with water preferably in the range of 90° to 120°.

Examples of the cross-linkable fluorine-containing compound include a perfluoroalkyl-containing silane compound (e.g., (heptadecafluoro-1,1,2,2-tetradecyl)triethoxysilane) and a fluorine-containing copolymer derived from fluorine-containing monomers and monomers introducing cross-linking groups.

Examples of the fluorine-containing monomers include fluoroolefins (e.g., fluoroethylene, vinylidene fluoride, tetrafluoroethylene, hexafluoroethylene, hexafluoropropylene, perfluoro-2,2-dimethyl-1,3-dioxole), partially or completely fluorinated (meth)acrylic alkyl ester derivatives (e.g., Biscoat 6FM [trade name, Osaka Organic Chemicals Co., Ltd.], M-2020 [trade name, Daikin Co., Ltd.], and partially or completely fluorinated vinyl ethers.

Examples of the monomers introducing cross-linking groups include a (meth)acrylate monomer having a cross-linking group (e.g., glycidyl methacrylate), and a (meth)acrylate monomer having carboxyl, hydroxyl, amino or sulfonic acid group (e.g., (meth)acrylic acid, methylol (meth)acrylate, hydroxyalkyl (meth)acrylate, allylic acrylate). After the (meth)acrylate monomers having carboxyl, hydroxyl, amino or sulfonic acid group are copolymerized, cross-linked structure can be formed in the manner described in Japanese Patent Provisional Publication Nos. 10(1998)-25388 and 10(1998)-147739.

As well as the copolymer derived from fluorine-containing monomers and monomers introducing cross-linking groups, a copolymer derived from these monomers and other monomers can be also used for the low refractive index layer.

The usable monomers other than the above monomers are not particularly restricted. Examples of them include olefins (e.g., ethylene, propylene, isoprene, vinyl chloride, vinylidene chloride), acrylate esters (e.g., methyl acrylate, ethyl acrylate, 2-ethylhexyl acrylate), methacrylate esters (e.g., methyl methacrylate, ethyl methacrylate, butyl methacrylate, ethylene glycol dimethacrylate), styrene derivatives (e.g., styrene, divinylbenzene, vinyltoluene, α-methylstyrene), vinyl ethers (e.g., methylvinyl ether), vinyl esters (e.g., vinyl acetate, vinyl propionate, vinyl cinnamate), acrylamides (e.g., N-tert-butylacrylamide, N-cyclohexylacrylamide), methacrylamides and acrylonitrile derivatives.

In the fluorine-containing resin used in the low refractive index layer, superfine particles of Si oxide are preferably dispersed to make the layer tough against scratching. The mean size of the Si oxide particles is preferably in the range of not more than 0.1 μm, more preferably in the range of 0.001 to 0.05 μm. The lower refractive index the fluorine-containing resin has, the more the layer is prevented from reflecting light. However, if the refractive index is too low, the scratching resistance is impaired. Accordingly, the refractive index of the resin and the amount of the Si oxide particles are controlled so adequately that the refractive index and the scratching resistance may be optimally balanced.

As the superfine particles of Si oxide, commercially available silica sol dispersed in an organic solvent can be directly added to a coating solution for forming the low refractive index layer. Otherwise, various commercially available silica powders may be dispersed in an organic solvent to prepare a silica dispersion to use.

When vertically peeled from a film of cellulose triacetate (TAC) or polyethylene terephthalate (PET) at ordinary temperature and ordinary humidity, the anti-reflection film is electrified preferably in the range of −200 to +200 pc (pico coulomb)/cm$^2$, more preferably in the range of −100 to +100 pc/cm$^2$, further preferably in the range of −50 to +50 pc/cm$^2$. Most preferably, the film is not electrified. [The unit 1 pc means $10^{-12}$ coulomb.]

In detail, the film is electrified at ordinary temperature and 10% RH preferably in the range of −100 to +100 pc/cm$^2$, further preferably in the range of −50 to +50 pc/cm$^2$. Most preferably, the film is not electrified.

The above-described electrification amount (vertically-peeling electrified charge) is measured in the following manner.

The sample to be measured is beforehand left for 2 hours or more under the condition of predetermined temperature and humidity. The measuring apparatus comprises a stage on which the sample is mounted, a head which holds a testing film and which repeatedly compresses and peels the testing film onto and from the sample, respectively, and an electrometer which is provided on the head to measure electrified charge on the sample. The sample is mounted on the stage, and then a TAC or PET film is installed in the head. After the apparatus is discharged, the head is repeatedly compressed onto and parted from the sample. The electrified charges after the testing film is peeled at the first and the fifth are measured and averaged. The procedure is repeated with respect to three samples, and the obtained values are averaged to determine the vertically-peeling electrified charge.

It depends on the materials of the sample and the testing film whether the electrified charge is positive or negative. However, the absolute value of the electrified charge is important.

Generally, a sample electrified at low humidity shows a high absolute value of the electrified charge. The anti-reflection film of the invention shows a high absolute value of the electrified charge at ordinary temperature and ordinary humidity or 10% RH, and hence is excellent in dustproof.

The contents of various elements of the anti-reflection film surface are controlled so that the electrified charge may be in the above-described range.

The anti-reflection film has a surface resistance of $1 \times 10^{11}$ Ω or more, preferably $1 \times 10^{12}$ Ω or more. The surface resistance can be measured according to the disc electrode method regulated in JIS. In the method, the current value is measured 1 minute after the voltage is applied so as to determine the surface resistance (SR).

It should be noted that the present invention essentially differs from a method in which the surface resistance is enough small (for example, $1 \times 10^{10}$ Ω or less) to improve dustproof (to prevent the film from catching dust). Since the surface resistance is too small to ensure the quality of displayed image, that method is not adopted in the invention. In the present invention, the absolute value of the vertically-peeling electrified charge is made so small that the surface resistance does not need to be small. Accordingly, the surface resistance in the invention can be set $1 \times 10^{11}$ Ω or more, and thereby the image quality is ensured.

The anti-reflection film reflects incident light in the wavelength region of 450 to 650 nm coming at the incident angle of 5° in an average mirror reflectance of 2.5% or less. The average mirror reflectance is preferably 1.2% or less, more preferably 1.1% or less.

Further, the incident light in the wavelength region of 450 to 650 nm coming at the incident angle of 5° is reflected preferably in an integrated reflectance of 2.5% or less. The average integrated reflectance is more preferably 2.3% or less.

The light coming at the incident angle of 5° and the mirror reflectance of that incident light are explained below.

The mirror reflectance of light coming at the incident angle of 5° is a ratio of the intensity of light reflected out at the angle of −5° to the normal per the intensity of incident light coming at the angle of +5° to the normal. The mirror reflectance indicates how much the surface reflects surrounding scenes. An anti-glare anti-reflection film shows a small mirror reflectance because it has a rough surface (which is provided for anti-glare performance) scattering the incident light to reduce the intensity of reflected light. Therefore, the mirror reflectance indicates both anti-reflection character and anti-glare character.

On the other hand, the integrated reflectance of light coming at the incident angle of 5° is a ratio of the total intensity of light reflected out in all directions per the intensity of incident light coming at the angle of +5° to the normal. Since it is not reduced by scattered light, the integrated reflectance indicates only anti-reflection character.

In the invention, the mirror reflectance and the integrated reflectance of light in the wavelength region of 450 to 650 nm coming at the incident angle of 5° are both controlled at 2.5% or less to realize both satisfying anti-reflection character and sufficient anti-glare character.

If the anti-reflection film reflects light in the wavelength region of 450 to 650 nm coming at the incident angle of 5° in an average mirror reflectance of more than 2.5%, it reflects surrounding scenes so much that a display equipped with the film gives an image of poor visibility.

If the anti-reflection film reflects light in the wavelength region of 450 to 650 nm coming at the incident angle of 5° in an average integrated reflectance of more than 2.5%, a display equipped with the film gives an image of poor contrast. The image is whitened by light scattered by the rough surface (which is provided for anti-glare performance), and accordingly the quality of the image is impaired.

The anti-reflection film is preferably designed so that the perpendicularly reflected light may have chromaticity satisfying the conditions of $$L^* \leq 10,\ 0 \leq a^* \leq 2,\ \text{and}\ -5 \leq b^* \leq 2$$

in which L*, a* and b* are values in L*a*b* color space of CIE 1976. The perpendicularly reflected light having such chromaticity shows neutral chromaticity.

The chromaticity of perpendicularly reflected light having been emitted from the CIE standard light source D65 and having entered at the incident angle of 5° can be evaluated in terms of the L*, a* and b* values in L*a*b* color space of CIE 1976. The L*, a* and b* values are calculated from the spectral reflection spectrum, which is obtained from the product (at each wavelength) of the measured mirror reflectance of light in the wavelength region of 380 to 780 nm coming at the incident angle of 5° and the intensity in the spectral distribution of original light emitted from the light source D65.

If the L* value is 10 or more, the film cannot fully prevent the display surface from reflecting incident light. If the a* value is more than 2, the reflected light is unnaturally colored in violet. On the other hand, if the a* value is less than 0, the reflected light is unnaturally colored greenly. If the b* value is less than −5, the reflected light is unnaturally colored in blue. On the other hand, if the b* value is more than 2, the reflected light is unnaturally colored in yellow.

The refractive index of the low refractive index layer and that of the binder material for the anti-glare layer are balanced optimally so that the anti-reflection film may have a low refractive index and may give reflected light having neutral chromaticity.

A known anti-reflection film comprising three or more optical thin layers formed by deposition or spattering can be made to give an average mirror reflectance of 0.3% or less, and accordingly its L* value can be reduced to 3 or less. However, in that case, the values of a* and b* are 10 or more and less than −10, respectively. Accordingly, the film gives unnaturally colored reflected light. In contrast, the anti-glare anti-reflection film of the invention is remarkably improved in unnatural coloring of the reflected light.

(Transparent Substrate)

The transparent substrate can be made of transparent resin or transparent glass. Examples of the transparent resin include cellulose triacetate (TAC) [refractive index: 1.48], polyethylene terephthalate (PET), diacetylene cellulose, acetatebutylate cellulose, poly(ether sulphone), polyacrylic resin, polyurethane resin, polyester, polycarbonate, polysulfone, polyether, poly(methyl pentene), poly(ether ketone), and (meth)acrylonitrile. The thickness of the substrate is normally in the range of 25 to 1,000 μm.

The transparent substrate is provided on the top surface of the polarizing plate, and hence is preferably made of cellulose acetate, which is generally used for a protective film of the polarizing plate. The substrate of cellulose acetate has both enough transparency and enough smooth surfaces to be preferably used in the diffusion film of the invention.

In the invention, cellulose acetate having an acetic acid content of 59.0 to 61.5% is preferably used. The term "acetic acid content" means the amount of combined acetic acid per one unit weight of cellulose. The acetic acid content is determined according to ASTM: D-817-91 (tests of cellulose acetate).

The cellulose ester has a viscosity average polymerization degree (DP) of preferably 250 or more, more preferably 290 or more. Further, it is also preferred for the cellulose ester used in the invention to have a narrow molecular weight distribution of Mw/Mn (Mw and Mn are weight and number average molecular weights, respectively) which is determined by gel permeation chromatography. The value of Mw/Mn is preferably in the range of 1.0 to 1.7, more preferably in the range of 1.3 to 1.65, most preferably in the range of 1.4 to 1.6.

Generally, hydroxyl groups at 2-, 3- and 6-position of cellulose acylate are not equally substituted (namely, the substitution degree at each position is not equal to one third of the total substitution degree), and the substitution degree at 6-position is apt to be relatively small. In the cellulose acylate used in the invention, the substitution degree at 6-position is preferably larger than those at 2- and 3-positions. The hydroxyl group at 6-position is substituted with acyl group in an amount of preferably 32% or more, more preferably 33% or more, most preferably 34% or more, based on the total substitution degree. Further, the substitution degree of the acyl group at 6-position is preferably 0.88 or more. The hydroxyl group at 6-position may be substituted with acyl group other than acetyl. Examples of the other acyl group are acyl groups having 3 or more carbon atoms (e.g., propionyl, butyloyl, valeroyl, benzoyl, acryloyl). The substitution degree at each position can be measured by means of NMR.

Cellulose acylates prepared according to the methods described in Japanese Patent Provisional Publication No. 11(1999)-5851 are usable for the invention.

The cellulose acetate film is preferably prepared according to solvent cast method. In the solvent cast method, a dope in which cellulose acetate is dissolved in an organic solvent is used.

Examples of the organic solvent include an ether having 3 to 12 carbon atoms, a ketone having 3 to 12 carbon atoms, an ester having 3 to 12 carbon atoms, and a halogenated hydrocarbon having 1 to 6 carbon atoms.

The ether, the ketone or the ester may have a cyclic structure. A compound having two or more functional groups of ether, ketone or ester (—O—, —CO— or —COO—) is also usable as the solvent. The organic solvent may have other functional groups such as alcoholic hydroxyl. If the solvent is the compound having two or more functional groups, the number of carbon atoms is in any of the above ranges.

Examples of the ether having 3 to 12 carbon atoms include diisopropyl ether, dimethoxymethane, dimethoxyethane, 1,4-dioxane, 1,3-dioxolan, tetrahydrofuran, anisole and phenetole.

Examples of the ketone having 3 to 12 carbon atoms include acetone, methylethyl ketone, diethyl ketone, diisobutyl ketone, cyclohexanone and methylcyclohexane.

Examples of the ester having 3 to 12 carbon atoms include ethyl formate, propyl formate, pentyl formate, methyl acetate, ethyl acetate and pentyl acetate.

Examples of the compound having two or more functional groups include 2-ethoxyethyl acetate, 2-methoxyethanol and 2-butoxyethanol.

The halogenated hydrocarbon preferably has one or two carbon atoms, more preferably one carbon atom. The halogen is preferably chlorine. The hydrogen in the halogenated hydrocarbon is substituted with halogen in an amount of preferably 25 to 75 mol. %, more preferably 30 to 70 mol. %, further preferably 35 to 65 mol. %, most preferably 40 to 60 mol. %. A typical halogenated hydrocarbon is methylene chloride.

Two or more kinds of the solvents may be mixed to use in combination.

The cellulose acetate solution can be prepared in an ordinary manner. The term "ordinary manner" means that the preparation is carried out at a temperature of 0° C. or more (room temperature or elevated temperature). The cellulose acetate solution (dope) can be prepared through a common process by means of a common apparatus in the normal solvent cast method. In the normal process, a halogenated hydrocarbon (particularly, methylene chloride) is preferably used as the solvent. A non-chlorine-containing solvent is also usable as described in Japanese Patent publication 2001-1745.

The amount of cellulose acetate in the solution is preferably in the range of 10 to 40 wt. %, more preferably in the range of 10 to 30 wt. %. To the organic (main) solvent, additives described below may be optionally added.

Cellulose acetate and the organic solvent are mixed and stirred at room temperature (0 to 40° C.) to prepare the solution. For preparing the concentrated solution, the preparation may be carried out at an elevated temperature under a high pressure. In that case, the cellulose acetate and the organic solvent are placed in a vessel resisting pressure. After the vessel is sealed, the mixture is stirred under an increased pressure at an elevated temperature. The temperature is controlled so that it may be higher than the boiling point of the solvent at atmospheric pressure but so that the solvent may not boil. The temperature is normally in the range of 40° C. or more, preferably in the range of 60 to 200° C., more preferably in the range of 80 to 110° C.

Before placed in the vessel, the components of the solution may be beforehand mixed. They may be also successively added into the vessel. The vessel must be equipped with a stirring means. Inactive gas such as nitrogen gas may be charged in the vessel to increase the inner pressure. Otherwise, the vessel may be heated to elevate the vapor pressure of the solvent so that the inner pressure may increase. After the vessel is sealed, each component may be added under an elevated pressure.

The vessel is preferably heated from outside. For example, a jacket heater is preferably used. Otherwise, liquid heated with a plate heater placed outside of the vessel may be made to flow through a pipe wound around the vessel, to heat the whole vessel.

The mixture is preferably stirred with a propeller mixer provided in the vessel. The wing of the propeller preferably has a length reaching the inside wall of the vessel. Further, at the tip of the wing, a scratching mean is provided to scratch and renew liquid attached on the inside wall.

In the vessel, various meters such as pressure gauge and thermometer may be provided. The components are dissolved in the solvent in the vessel. The thus-prepared dope may be cooled and then taken out of the vessel, or may be taken out and then cooled with a heat exchanger.

The solution can be prepared according to the cooling dissolution method, which makes it possible to dissolve cellulose acetate in an organic solvent in which cellulose acetate cannot be dissolved by a conventional process. Further, according to that method, cellulose acetate can be rapidly and homogeneously dissolved in an organic solvent in which cellulose acetate can be dissolved by a conventional process.

First in the process of cooling dissolution method, cellulose acetate is gradually added with stirring into an organic solvent at room temperature. The amount of cellulose acetate in the mixture is preferably in the range of 10 to 40 wt. %, more preferably in the range of 10 to 30 wt. %. Various additives described below may be added in the mixture.

The prepared mixture is cooled to a temperature of −100 to −10° C., preferably −80 to −10° C., more preferably −50 to −20° C., most preferably −50 to −30° C. The cooling procedure can be carried out, for example, with dry ice-methanol bath (−75° C.) or with cooled ethylene glycol solution (−30 to −20° C.). Through the cooling procedure, the mixture is solidified.

The cooling rate is preferably 4° C./minute or more, more preferably 8° C./minute or more, and most preferably 12° C./minute or more. The cooling rate is preferably as fast as possible. However, a theoretical upper limit of the cooling rate is 10,000° C. per second, a technical upper limit is 1,000° C. per second, and a practical upper limit is 100° C. per second. The cooling rate means the change of temperature at the cooling step per the time taken to complete the cooling step. The change of temperature means the difference between the temperature at which the cooling step is started and the temperature at which the cooling step is completed.

The cooled mixture is then warmed to a temperature of 0 to 200° C., preferably 0 to 150° C., more preferably 0 to 120° C., most preferably 0 to 50° C. Through the warming procedure, cellulose acetate is dissolved in the organic solvent. For warming, the mixture may be left at room temperature or may be heated in a warm bath.

The warming rate is 4° C./minute or more, more preferably 8° C./minute or more, and most preferably 12° C./minute or more. The warming rate is preferably as fast as possible. However, a theoretical upper limit of the cooling rate is 10,000° C. per second, a technical upper limit is 1,000° C. per second, and a practical upper limit is 100° C. per second. The warming rate means the change of temperature at the warming step per the time taken to complete the warming step. The change of temperature means the difference between the temperature at which the warming step is started and the temperature at which the warming step is completed.

Thus, a homogeneous solution can be prepared. If cellulose acetate is not sufficiently dissolved, the cooling and warming procedures may be repeated. It can be judged by observation with the eyes whether cellulose acetate is sufficiently dissolved or not.

In the process of cooling dissolution method, a sealed vessel is preferably used to prevent contamination of water, which may be caused by dew condensation at the cooling step. Further, the mixture may be cooled under a reduced pressure so that the time taken to complete the cooling step can be shortened, and hence a vessel resisting pressure is preferably used to conduct the procedures under a reduced pressure.

According to differential scanning calorimetric measurement (DSC), a 20 wt. % solution prepared by dissolving cellulose acetate (acetic acid content: 60.9%, viscosity average polymerization degree: 299) in methyl acetate through the cooling dissolution process has a pseudo-phase transition point between gel and sol at about 33° C. Below that temperature, the solution is in the form of homogeneous gel. The solution, therefore, must be kept at a temperature above the pseudo-phase transition point, preferably at a temperature higher than the pseudo-phase transition point by about 10° C. The pseudo-phase transition point depends upon various conditions such as the organic solvent, the acetic acid content, the viscosity average polymerization degree and the concentration of cellulose acetate.

The cellulose acetate film is formed from the prepared cellulose acetate solution (dope) according to the solvent cast method.

The dope is cast on a drum or a band, and the solvent is evaporated to form a film. The solid content of the dope is preferably controlled in the range of 18 to 35%. The surface of the drum or band is preferably beforehand polished to be a mirror. The casting and drying steps of the casting method are described in U.S. Pat. Nos. 2,336,310, 2,367,603, 2,492,078, 2,492,977, 2,492,978, 2,607,704, 2,739,069, 2,739,070, British Patent Nos. 640,731, 736,892, Japanese Patent Publication Nos. 45(1970)-4554, 49(1974)-5614, Japanese Patent Provisional Publication Nos. 60(1985)-176834, 60(1985)-203430 and 62(1987)-115035.

The surface temperature of the drum or band is preferably 10° C. or below. After cast on the drum or band, the dope is blown with air for 2 seconds or more to dry. The formed film is then peeled, and blown with hot air whose temperature is successively changed from 100° C. to 160° C. in order to evaporate remaining solvent. This procedure is described in Japanese Patent Publication No. 5(1993)-17844. The procedure can shorten the time taken to complete the steps of cooling to peeling. For performing the procedure, the cast dope must gel at the surface temperature of the drum or band.

From the prepared cellulose acylate solution (dope), a film comprising two or more layers can be formed. Also in that case, the film is preferably formed by the solvent cast method. The dope is cast on a drum or a band, and the solvent is evaporated to form a film. The solid content of the dope is preferably controlled in the range of 10 to 40%. The surface of the drum or band is preferably beforehand polished to be a mirror.

Two or more cellulose acylate solutions can be cooperatively cast to form two or more layers. For example, two or more outlets are arranged at intervals along the running direction of the support (drum or band), and from each outlet each cellulose acylate solution is cast to form a layered film (Japanese Patent Provisional Publication Nos. 61(1986)-158414, 1(1989)-122419 and 11(1999)-198285). Otherwise, cellulose acylate solutions may be cast from two outlets to form a film (Japanese Patent Publication No. 60(1985)-27562, Japanese Patent Provisional Publication Nos. 61(1986)-94724, 61(1986)-947245, 61(1986)-104813, 61(1986)-158413 and 6(1994)-134933). Further, a flow of high-viscous cellulose acylate solution may be enclosed with a flow of low-viscous one to form a layered flow, and the high- and low-viscous solutions in the layered flow may be simultaneously extruded to produce a film (Japanese Patent Provisional Publication No. 56(1981)-162617).

Further, Japanese Patent Publication No. 44(1969)-20235 discloses another film preparation. In the disclosed process, a cellulose acylate solution is cast on the support from one outlet to form a film. After peeled from the support, the formed film is turned over and again placed on the support. On the thus appearing surface (having been in contact with the support), another cellulose acylate solution is cast from another outlet to form a film.

The used cellulose acylate solutions may be the same or different from each other. The function of each cellulose acylate layer can be given by each corresponding solution extruded from each outlet.

Other functional layers (e.g., adhesive layer, dye layer, antistatic layer, anti-halation layer, UV absorbing layer, polarizing layer) can be simultaneously formed from the cellulose acylate solutions in the above manner.

In a conventional single layer preparation process, it is necessary to extrude a cellulose acylate solution having such high concentration and such high viscosity that the resultant film may have the aimed thickness. Accordingly, that cellulose acylate solution is often so unstable that solid contents are deposited to cause troubles and to impair the planeness. To avoid the problem, plural concentrated cellulose acylate solutions are simultaneously extruded from outlets onto the support. The thus-prepared thick film has excellent planeness. In addition, since the concentrated solutions are used, the film is so easily dried that the productivity (particularly, production speed) can be improved.

A plasticizer can be added into the cellulose acylate solution to enhance mechanical strength of the resultant film or to shorten the time for drying. The plasticizer is, for example, a phosphate ester or a carbonate ester. Examples of the phosphate ester used as the plasticizer include triphenyl phosphate (TPP), diphenylbiphenyl phosphate, and tricresyl phosphate (TCP). Typical examples of the carbonate ester are phthalate esters and citrate esters. Examples of the phthalate esters include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citrate esters include triethyl o-acetylcitrate (OACTE) and tributyl o-acetylcitrate (OACTB). Besides the above, butyl oleate, methylacetyl ricinolate, dibutyl sebacate and various trimellitic esters are also usable. The plasticizers of phosphate esters (DMP, DEP, DBP, DOP, DPP, DEHP) are preferred. Particularly preferred are DEP and DPP. The content of the plasticizer is preferably in the range of 0.1 to 25 wt. %, more preferably in the range of 1 to 20 wt. %, most preferably in the range of 3 to 15 wt. % based on the amount of cellulose ester.

Further, a deterioration inhibitor (e.g., oxidation inhibitor, peroxide decomposer, radical inhibitor, metal inactivating agent, oxygen scavenger, amine) may be incorporated in the cellulose acetate film. The deterioration inhibitor is described in Japanese Patent Provisional Publication Nos. 3(1991)-199201, 5(1993)-1907073, 5(1993)-194789, 5(1993)-271471 and 6(1994)-107854. The content of the deterioration inhibitor is preferably in the range of 0.01 to 1 wt. %, more preferably in the range of 0.01 to 0.2 wt. % based on the amount of the dope. If the content is less than 0.01 wt. %, the deterioration inhibitor gives little effect. If the content is more than 1 wt. %, the inhibitor often oozes out (bleeds out) to appear on the surface of the film. Particularly preferred deterioration inhibitors are butylated hydroxytoluene (BHT) and tribenzylamine (TBA).

The cellulose acetate film is preferably subjected to surface treatment. Examples of the surface treatment include glow discharge treatment, corona discharge treatment, ultraviolet (UV) treatment, flame treatment, and acid or alkali treatment. Further, an undercoating layer is preferably provided as described in Japanese Patent Provisional Publication No. 7(1995)-333433.

For ensuring the planeness of the film, the above treatments are carried out preferably at a temperature not higher than Tg (not higher than 150° C.).

In the case where the film is used as a protective film of the polarizing plate, the acid or alkali treatment is preferably carried out to saponify the surface of the cellulose acetate film. That treatment enhances the adhesion between the polarizing plate and the film. The surface energy is preferably not less than 55 mN/m, more preferably in the range of 60 to 75 mN/m.

The alkali saponification treatment is explained below.

That treatment comprises the steps of immersing the film surface in an alkaline solution, neutralizing with an acidic solution, washing with water, and drying.

Examples of the alkaline solution include solutions of KOH and NaOH. The normality of hydroxyl ion is preferably in the range of 0.1 to 3.0 N, more preferably in the range of 0.5 to 2.0 N. The temperature of the solution is preferably in the range of room temperature to 90° C., more preferably in the range of 40 to 70° C.

From the viewpoint of productivity, the alkaline solution is preferably coated on the film surface in place of immersing, and washed away with water after saponification. As the solvent for the coating solution, alcohols (e.g., IPA, n-butanol, methanol, ethanol) are preferred in consideration of wettability. Further, a dissolving aid such as water, propylene glycol or ethylene glycol is preferably added in the coating solution.

The surface energy can be measured by the contact angle method, the wet heating method or the adsorption method (these methods are described in 'The basic theory and application of wetting (written in Japanese)', published by Realize Co., Ltd, 1989). The contact angle method is preferred. In that method, two solutions having known surface energies are dropped onto the film. The contact angle of each drop is measured, and the surface energy of the film is calculated from the measured contact angles. The contact angle is, by definition, an angle (including the drop) between the film surface and the tangent of the drop surface at the crossing point.

The transparent substrate can be made of an optically anisotropic polymer film. The optical anisotropy can be optically uniaxial or optically biaxial.

The optically anisotropic polymer film itself can optically function in an image display. The Re retardation value of the film is preferably in the range of 0 to 200 nm. The Rth retardation value is preferably in the range of 70 to 400 nm.

In the case that a liquid crystal cell is of a TN mode, the Re retardation value is preferably in the range of 0 to 20 nm, and the Rth retardation value is preferably in the range of 70 to 250 nm. In the case that a liquid crystal cell is of an OCB or VA mode, the Re retardation value is preferably in the range of 20 to 100 nm, and the Rth retardation value is preferably in the range of 150 to 500 nm.

The optically anisotropic polymer film preferably has a birefringent index in plane ($\Delta n$:nx−ny) of less than 0.002. The film also preferably has a birefringent index along the thickness direction ($\{(nx+ny)/2\}-nz$) in the range of 0.001 to 0.04.

The Re retardation value is defined by the following formula.

$$Re=(nx-ny)\times d$$

In the formula, nx is a refractive index along the slow axis (direction giving the maximum refractive index) in the plane; ny is a refractive index along the fast axis (direction giving the minimum refractive index) in the plane; and d is the thickness (nm) of the film.

The Re retardation value is defined by the following formula.

$$Rth=[\{(nx+ny)/2\}-nz]\times d.$$

In the formula, nx is a refractive index along the slow axis (direction giving the maximum refractive index) in the plane; ny is a refractive index along the fast axis (direction giving the minimum refractive index) in the plane; nz is a refractive index along the thickness direction; and d is the thickness (nm) of the film.

An aromatic compound having at least two aromatic rings can be used as a retardation increasing agent to adjust the retardation of the optically anisotropic polymer film (particularly a cellulose acetate film).

The aromatic compound is added in an amount of 0.01 to 20 weight parts, preferably in an amount of 0.05 to 15 weight parts, more preferably in an amount of 0.1 to 10 weight parts, based on 100 weight parts of polymer. Two or more aromatic compounds may be used in combination.

In the present invention, the term "an aromatic ring" includes an aromatic heterocyclic ring as well as an aromatic hydrocarbon ring.

As the aromatic hydrocarbon ring, a six-membered ring (namely, a benzene ring) is preferred.

The aromatic heterocyclic ring is generally unsaturated. The aromatic heterocyclic ring is preferably a five-, six- or seven-membered ring, and more preferably a five- or six-membered ring. The aromatic heterocyclic ring generally has double bonds as many as possible. The hetero-atom in the ring preferably is nitrogen atom, sulfur atom or oxygen atom, and more preferably is nitrogen atom. Examples of the aromatic heterocyclic ring include furan ring, thiophene ring, pyrrole ring, oxazole ring, isoxazole ring, thiazole ring, isothiazole ring, imidazole ring, pyrazole ring, furazane ring, triazole ring, pyran ring, pyridine ring, pyridazine ring, pyrimidine ring, pyrazine ring and 1,3,5-triazine ring.

Preferred aromatic rings are benzene ring, furan ring, thiophene ring, pyrrole ring, oxazole ring, thiazole ring, triazole ring, pyridine ring, pyrimidine ring, pyrazine ring and 1,3,5-triazine ring. Benzene ring and 1,3,5-triazine ring are more preferred The aromatic compound preferably contains at least one 1,3,5-triazine ring.

The number of aromatic rings in the aromatic compound is preferably in the range of 2 to 20, more preferably in the range of 2 to 12, further preferably in the range of 2 to 8, and most preferably in the range of 2 to 6.

The relation of the two or more aromatic rings is categorized into three cases, namely (a) the case in which the aromatic rings form a condensed ring, (b) the case in which the aromatic rings are connected through a single bond, and (c) the case in which the aromatic rings are connected through a linking group.

In case (c), a spiro-bonding is not formed because the rings are aromatic.

The relation of the aromatic rings may be any of the cases (a) to (c).

Examples of the retardation increasing agents are described in Japanese Patent Provisional Publication Nos. 2000-111914, 2000-275434, WO00/2619A1, WO01/88574A1 and Japanese Patent Application No. 2002-70009.

For preventing the polymer film from being swollen with moisture (for reducing the moisture swelling coefficient of the polymer film), the film is preferably stretched. The stretching is preferably performed so that distortions in all the directions in plane may be evenly inhibited, and hence biaxial stretching is preferred.

In the biaxial stretching, the film is simultaneously or successively stretched in two directions (namely, simultaneous biaxial stretching or successive biaxial stretching). The successive biaxial stretching is preferred in consideration of continuous production. The process of the successive biaxial stretching comprises the steps of casting the dope, peeling the formed film from the band or drum, stretching the film laterally (perpendicularly to the casting direction), and then stretching the film longitudinally The longitudinal stretching step may be performed prior to the lateral stretching.

Japanese Patent Provisional Publication Nos. 62(1987)-115035, 4(1992)-152125, 4(1992)-284211, 4(1992)-298310 and 11(1999)-48271 describe the lateral stretching, which is performed at room temperature or an elevated temperature. The elevated temperature is preferably below the glass transition point of the film. The film can be stretched while being dried in the film production. Preferably, the film is stretched while the solvent still remains in the film. The longitudinal stretching can be performed, for example, by controlling the conveying rollers so that the speed of winding up the film may be faster than that of peeling the film. The lateral stretching, on the other hand, can be performed by gradually widening the interval between tenters clipping both sides of the conveyed film. Otherwise, after the film is dried, it can be stretched by means of a stretching machine (preferably, the film is monoaxially stretched by means of a long stretching machine). The expanding ratio of stretching (the ratio of length increased by stretching based on the original length) is preferably in the range of 5 to 50%, more preferably in the range of 10 to 40%, most preferably in the range of 15 to 35%.

(Optically Anisotropic Layer)

The liquid crystal compound used in the optically anisotropic layer may be either rod-like or discotic one. The compound may be a polymer liquid crystal or a monomer liquid crystal of low molecular weight. Further, a polymer in which liquid crystal molecules of low molecular weight are cross-linked and thereby which no longer behaves as liquid crystal is also usable. A disoctic liquid crystal compound is most preferably used in the invention Preferred examples of the rod-like liquid crystal compound are described in Japanese Patent Publication No. 2000-304932. Examples of the disoctic liquid crystal compound include benzene derivatives described in C. Destrade et al., Mol. Cryst. vol. 71, pp. 111, (1981); truxene derivatives described in C. Destrade et al., Mol Cryst. vol. 122, pp. 141. (1985), Physics lett. A, vol. 78, pp. 82, (1990); cyclohexane derivatives described in B. Kohn et al., Angew. Chem. vol. 96, pp. 70, (1984); and macrocyclic compounds of azacrown-type or phenylacetylene-type described in J. M. Lehn et al., J. Chem. Commun. pp. 1794, (1985), and J. Zhang et al., J. Am. Chem. Soc. vol. 116, pp. 2655, (1994).

The above discotic liquid crystal compound generally has a structure in which the discotic structure unit is located at the center as a parent core and further straight chain groups such as alkyl, alkoxy and substituted benzoyl are radically substituted. The discotic liquid crystal compound generally has the properties of liquid crystal. Substance derived from the discotic compound is not always the above-described compound. For example, the low molecular weight discotic liquid crystal compound having a thermo- or photo-reactive group is polymerized by heat or light to form a polymer that does not behave as liquid crystal. Such polymer can be also used in the invention. Preferred examples of the discotic liquid crystal compound are described in Japanese Patent Provisional Publication No. 8(1996)-50206.

The optically anisotropic layer is formed of a compound having one or more discotic structure units, and the discotic structure units preferably have planes inclined from a plane of the transparent support at an angle varying in (along) the direction of depth of the optically anisotropic layer.

The above-described angle (inclined angle) of the plane of discotic structure unit generally increases or decreases with increase of distance in the direction of depth from the bottom of the optically anisotropic layer. The inclined angle preferably increases with increase of the distance. Further, examples of variation of the inclined angle include continuous increase, continuous decrease, intermittent increase, intermittent decrease, variation containing continuous increase and decrease, and intermittent variation containing increase or decrease. The intermittent variation contains an area where the inclined angle does not vary in the course of the thickness direction of the layer. The inclined angle preferably totally increases or decreases in the layer, even if it does not vary in the course. The inclined angle more preferably increases totally, and it is particularly preferred to increase continuously.

The optically anisotropic layer can be generally prepared by coating the orientation layer with a solution of the discotic compound and other compounds dissolved in a solvent, drying, heating to a temperature for forming a discotic nematic phase, and cooling with the oriented condition (discotic nematic phase) kept. Otherwise, the layer can be prepared by coating the orientation layer with a solution of the discotic compound and other compounds (e.g., polymerizable monomer, photo-polymerization initiator) dissolved in a solvent, drying, heating to a temperature for forming a discotic nematic phase, polymerizing the heated layer (e.g., by radiation of UV light) and cooling. The transition temperature from discotic nematic phase to solid phase (temperature for heating) is preferably in the range of 70 to 300° C., especially 70 to 170° C.

The inclined angle of the discotic unit on the support side can be generally controlled by selecting the discotic compound or materials of the orientation layer, or by selecting methods for the rubbing treatment. The inclined angle of the discotic unit on the surface side (air side) can be generally controlled by selecting the discotic compound or other compounds (e.g., plasticizer, surface active agent, polymerizable monomer and polymer) used together with the discotic compound. Further, the extent of variation of the inclined angle can be also controlled by the above selection.

Any compound can be employed as the plasticizer, the surface active agent and the polymerizable monomer, so long as it is compatible with the discotic compound and it gives variation of the inclined angle or dose not inhibit the discotic compound molecules from aligning. Preferred is polymerizable monomer (e.g., compounds having a vinyl, vinyloxy, acryloyl or methacryloyl group). Those compounds are preferably used in the amount of 1 to 50 wt. % (especially 5 to 30 wt. %) based on the amount of the discotic compound. Preferred examples of the polymerizable monomer include a acrylate having plural functional groups. The number of the functional groups is preferably three or more, more preferably four or more, most preferably six. Preferred examples of the acrylate having six functional groups include dipentaerythritol hexaacrylate. Two or more kinds of monomers having different numbers of functional groups can be mixed to use in combination.

As the polymer, any polymer can be employed, so long as it is compatible with the discotic compound and it gives variation of the inclined angle. Cellulose esters are preferably used. Examples of the cellulose esters include cellulose acetate, cellulose acetatepropionate, hydroxypropylcellulose and cellulose acetatebutylate. The polymer is generally used in an amount of 0.1 to 10 wt. % (preferably 0.1 to 8.0 wt. %, more preferably 0.1 to 5.0 wt. %) based on the amount of the discotic compound, so as not to inhibit the discotic compound from aligning.

The optical compensatory sheet in the invention comprises a cellulose acetate film, an orientation layer and a discotic liquid crystal layer, piled up in order. The orientation layer is preferably made of cross-linked polymer, and preferably subjected to rubbing treatment.

(Orientation Layer)

The orientation layer in the invention is made of cross-linked two polymers. At least one of the polymers may be cross-linked by itself or with a cross-linking agent. In other words, the polymers which originally have functional groups or to which functional groups are introduced are reacted with light, heat or pH variation to form the orientation layer; or otherwise linking groups are introduced by a reactive cross-linking agent into the polymers so that the polymers are cross-linked to form the orientation layer.

In a normal process, a coating liquid containing the polymer and, if needed, the cross-linking agent is applied on the transparent support, and then heated to induce the cross-linking reaction. However, as long as the resultant optical compensatory sheet has enough durability, the reaction may be caused at any stage from the step of coating the support with the coating liquid to the step of producing the resultant sheet. In consideration of orientation of the discotic compound (in the optically anisotropic layer) on the orientation layer, the cross-linking reaction is preferably caused sufficiently after the discotic compound is aligned. When the coating liquid containing the polymer and the cross-linking agent is applied and heated to dry on the support, the cross-linking reaction generally proceeds at a certain degree. However, if the heating temperature is low, the reaction further proceeds when the discotic compound is heated to the temperature to form discotic nematic phase. Therefore, after the applied and dried layer is subjected to rubbing treatment to form an orientation layer, another coating liquid containing the discotic compound is applied and heated to the temperature to form discotic nematic phase. The heated liquid on the orientation layer is cooled to prepare the optically anisotropic layer.

Polymers cross-linkable either by itself or with cross-linking agents can be used for forming the orientation layer in the invention. Some polymers are cross-linkable both by itself and with a cross-linking agent, and of course they are also usable. Examples of the polymers include polymethyl metacrylate, acrylic acid/methacrylic acid copolymer, styrene/maleinimide copolymer, polyvinyl alcohol and denatured polyvinyl alcohol, poly(N-methylolacrylamide), styrene/vinyltoluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, carboxymethylcellulose, polyethylene, polypropylene, polycarbonate, and organic substances such as silan coupling agents. Preferred examples are water-soluble polymers such as poly(N-methylolacrylamide), carboxymethylcellulose, gelatin, polyvinyl alcohol and denatured polyvinyl alcohol. Polyvinyl alcohol and denatured polyvinyl alcohol are particularly preferred.

It is most preferred to use two kinds of polyvinyl alcohols or denatured polyvinyl alcohols having different polymerization degrees. The saponification degree of the polyvinyl alcohol is in the range of 70 to 100%, preferably in the range of 80 to 100%, more preferably in the range of 85 to 95%. The polymerization degree is preferably in the range of 100 to 3,000. Examples of the denatured polyvinyl alcohol include polyvinyl alcohols denatured by copolymerization (introduced denaturing group: COONa, $Si(OX)_3$, $N(CH_3)_3$.Cl, $C_9H_{19}COO$, $SO_3Na$, $C_{12}H_{25}$, etc.), by chain transfer (introduced denaturing group: COONa, SH, $C_{12}H_{25}$, etc.) and by block polymerization (introduced denaturing group: COOH, $CONH_2$, COOR, $C_6H_5$, etc.). Non- or denatured polyvinyl alcohols having saponification degrees of 80 to 100% is preferred, and alkylthio-denatured polyvinyl alcohols having 85 to 95% are particularly preferred. With respect to the denatured polyvinyl alcohols, Japanese Patent Provisional Publication No. 8(1996)-338913 describes in detail their syntheses, measurement of visible absorption spectra and method for determining the introducing ratios.

Examples of the cross-linking agent include aldehydes (e.g., formaldehyde, glyoxal, glutaraldehyde), N-methylol compounds (e.g., dimethylol urea, methyloldimethylhydantoin), dioxane derivatives (e.g., 2,3-dihydroxydioxane), compounds that works when the carboxylic group is activated (e.g., carbenium, 2-naphthalenesulfonate, 1,1-bispyrrolidino-1-chloropyridinium, 1-morpholinocarbonyl-3-(sulfonatoaminomethyl), active vinyl compounds (e.g., 1,3,5-triacryloyl-hexahydro-s-triazine, bis-(vinylsulfone) methane, N,N'-methylenebis-[β-vinyl-sulfonyl] propionamide), active halogen compounds (e.g., 2,4-dichloro-6-hydroxy-s-triazine), isooxazoles and dialdehyde starch. These are preferably used together with water-soluble polymers, particularly polyvinyl alcohol and denatured polyvinyl alcohols (including the above-described denatured polyvinyl alcohols). Two or more cross-linking agents may be used in combination. In consideration of productivity, reactive aldehydes are preferred. Particularly preferred is glutaraldehyde.

The more the cross-linking agent is added, the stronger moisture resistance the layer has. However, if the agent is incorporated in an amount of 50 wt. % or more based on the amount of the polymer, the resultant orientaion layer shows poor orienting effect. Accordingly, the amount of the cross-linking agent is in the range of preferably 0.1 to 20 wt. %, more preferably 0.5 to 15 wt. % based on the amount of the polymer. The amount of non-reacted cross-linking agent remaining in the orientation layer is preferably not more than 1.0 wt. %, more preferably not more than 0.5 wt. % based on the amount of the orientation layer. If the layer contains the non-reacted agent in an amount of more than 1.0 wt. %, the layer has poor durability. A liquid crystal display comprising such orientation layer often suffers troubles of reticulation if used for a long time or left under hot and humid condition.

The orientation layer can be formed by the steps of applying a coating liquid containing the above polymer and croslinking agent onto the transparent support, heating to dry and cross-link, and subjecting to rubbing treatment. As described above, the cross-linking reaction may be caused at any step after applying the coating liquid. In the case where a water-soluble polymer such as polyvinyl alcohol is used, the coating solution is preferably prepared from a mixed solvent of water and an organic solvent having defoaming character (e.g., methanol). The ratio of water/methanol is normally in the range of 0:100 to 99:1, preferably in the range of 0:100 to 91:9. Because of defoaming character of the organic solvent, defects on the orientation layer are remarkably decreased, and accordingly the optically anisotropic layer has an improved surface. As the coating method, known methods such as spin-coating, dip-coating, curtain-coating, extrusion-coating, bar-coating and E-type coating can be adopted. The E-type coating method is particularly preferred. The thickness of the layer is preferably in the range of 0.1 to 10 μm. The applied layer is dried at a temperature of 20 to 110° C. For ensuring sufficient cross-linking, the temperature is preferably in the range of 60 to 100° C., more preferably in the range of 80 to 100° C. The time for drying is in the range of 1 minute to 36 hours, preferably in the range of 5 minutes to 30 minutes. The pH is also preferably adjusted at an optimal value according to the used cross-linking agent. If glutaraldehyde is used as the cross-linking agent, the pH is preferably in the range of 4.5 to 5.5, more preferably at 5.0.

The orientation layer is provided on the transparent support or an undercoating layer. After the above-described polymer layer is cross-linked, the surface of the layer is subjected to rubbing treatment. The orientation layer determines the aligning direction of discotic liquid crystal compound provided thereon.

The rubbing treatment can be conducted in the manner adopted widely in aligning liquid crystal molecules of LCD. The surface of the layer is rubbed with paper, cloth (gauze, felt, nylon, polyester) or rubber along a certain direction, so as to give the aligning function. Generally, the layer is rubbed several times with cloth on which fibers having the same length and thickness are provided.

(Transparent Support)

The material of the support is not restricted as long as it is highly transparent plastic resin. A preferred material is cellulose acetate, which is also used for a protective film of the polarizing plate. The transparent support may be optically monoaxial or biaxial.

The transparent support, on which the optically anisotropic layer is provided, optically plays an important role. Therefore, the retardation value Re of the support is preferably in the range of 0 to 200 nm. The Rth of the support is preferably in the range of 70 to 400 nm.

If the liquid crystal display comprises two optically anisotropic cellulose acetate films, the Rth value of each film is preferably in the range of 70 to 250 nm.

If the liquid crystal display comprises one optically anisotropic cellulose acetate film, the Rth value of the film is preferably in the range of 150 to 400 nm.

The cellulose acetate film preferably has a birefringent index [Dn: nx−ny] of 0.00 to 0.002. The birefringent index along the film thickness [(nx+ny)/2−nz] is preferably in the range of 0.001 to 0.04.

The retardation value Re is determined according to the formula: Re=(nx−ny)×d in which nx is a refractive index along the show axis in the film plane (the maximum refractive index in the film plane), and ny is a refractive index perpendicular to the show axis in the film plane.

The retardation value Rth is determined according to the formula: Rth={(nx+ny)/2−nx}×d in which nx is a refractive index along the show axis in the film plane (the maximum refractive index in the film plane), ny is a refractive index along the traveling axis in the film plane (the minimum refractive index in the film plane), nz is a refractive index along the depth of the film, and d is thickness of the film in terms of nm.

(Polarizing Plate)

The polarizing plate comprises two transparent protective films and a polarizing membrane provided between the films. The diffusion film or anti-reflection film of the invention can be used as one of the protective films. A normal cellulose acetate film can be used as the other protective film.

Examples of the polarizing membrane include an iodine polarizing membrane, a polyene polarizing membrane and a dichromatic dye polarizing membrane. The iodine polarizing membrane and the dye polarizing membrane are generally prepared from polyvinyl alcohol films.

The transparent substrate of the diffusion film and the cellulose acetate film are placed so that the slow axes of the films may be essentially parallel to the transparent axis of the polarizing membrane.

It has been found that the moisture-permeability of the protective film is important for production of the polarizing plate. In producing the polarizing plate, the polarizing membrane and the protective film are laminated with an aqueous adhesive, and then the solvent of the adhesive is diffused into the film to dry. The higher permeability the film has, the more rapidly it is dried. Accordingly, the productivity of the polarizing plate is improved. However, if the permeability is too high, the outer moisture is liable to come into the membrane to impair polarizability if the liquid crystal display is used under humid condition.

The moisture-permeability depends upon various conditions such as thickness, free volume, and hydrophilicity (hydrophobicity) of the polymer film (and liquid crystal compound).

The protective film in the polarizing plate has a moisture-permeability preferably in the range of 100 to 1,000 $g/m^2 \cdot 24$ hours, more preferably in the range of 300 to 700 $g/m^2 \cdot 24$ hours.

In the film forming process, conditions and procedures such as rip flow, line speed, stretching and/or compressing are adequately selected to control the thickness of the transparent substrate. Since the moisture-permeability depends on the materials, the thickness may be controlled so that the preferable permeability can be obtained.

Also in the film forming process, drying conditions such as time and temperature are suitably determined to control the free volume of the transparent substrate. Since the moisture-permeability depends on the materials, the free volume may be controlled so that the preferable permeability can be obtained.

The hydrophilicity (hydrophobicity) of the transparent substrate can be controlled with additives. If hydrophilic additives are contained in the above free volume, the permeability is increased. If hydrophobic additives are added, the permeability is decreased.

The moisture-permeability can be thus independently controlled, and thereby the polarizing plate having optical compensatory function can be produced at small cost with high productivity.

The polarizing plate preferably comprises the diffusion film or the anti-reflection film of the invention, a polarizer, and an optically anisotropic layer, piled up in order.

The optically anisotropic layer may be provided on a polymer film, and may contain a discotic liquid crystal compound or a rod-like liquid crystal compound. A discotic liquid crystal compound is preferred. In preparing the optically anisotropic layer, molecules of the discotic liquid crystal compound are aligned and the thus-formed alignment is fixed.

Since the discotic liquid crystal molecules generally give large birefringence and have various alignment forms, an optically anisotropic layer prepared from the discptic liquid crystal molecules has a specific optical characteristic that cannot be obtained from the conventional stretched birefringent polymer film. The optically anisotropic layer comprising the discptic liquid crystal compound is described in Japanese Patent Provisional Publication No. 6(1996)-214116, U.S. Pat. Nos. 5,583,679 and 5,646,703, and West German Patent Publication No. 3911620A1.

(Image Display Device)

The diffusion film, the anti-reflection film or the polarizing plate of the invention is preferably used in an image display device. They are preferably placed on the top surface of the display device. The image display device is a liquid crystal display, an organic electro-luminescence display device, a plasma display panel or a cathode ray tube display. A liquid crystal display is particularly preferred.

A liquid crystal display of TN, VA, OCB, IPS or ECB mode comprises two polarizing plates and a liquid crystal cell provided between them. The liquid crystal cell comprises a pair of electrode substrates and liquid crystal molecules placed between them.

One optically anisotropic layer is placed between the cell and one of the polarizing plates. Otherwise, two optically anisotropic layers are placed on both sides of the cell (i.e., each layer is placed between the cell and each polarizing plate).

The liquid crystal cell works preferably according to VA mode, OCB mode or TN mode.

In a liquid crystal cell of VA mode, rod-like liquid crystal molecules are essentially vertically aligned while voltage is not applied.

The liquid crystal cell of VA mode include some types:
(1) a liquid crystal cell of VA mode in a narrow sense (described in Japanese Patent Provisional Publication No. 2(1990)-176625), in which rod-like liquid crystal molecules are essentially vertically aligned while voltage is not applied, and the molecules are essentially horizontally aligned while voltage is applied;
(2) a liquid crystal cell of MVA mode (described in SID97, Digest of tech. Papers, 28(1997), 845), in which the VA mode is modified to be multi-domain type so as to enlarge the viewing angle;
(3) a liquid crystal cell of n-ASM mode (described in Nippon Ekisho Toronkai [Liquid crystal forum of Japan], Digest of tech. Papers (1998), 58–59), in which rod-like liquid crystal molecules are essentially vertically aligned while voltage is not applied, and the molecules are essentially oriented in twisted multi-domain alignment while voltage is applied; and
(4) a liquid crystal cell of SURVAIVAL mode (published in LCD international 98).

The liquid crystal cell of OCB mode is a liquid crystal cell of bend alignment mode in which rod-like liquid crystal molecules in upper part and ones in lower part are essentially reversely (symmetrically) aligned. A liquid crystal display having the liquid crystal cell of bend alignment mode is disclosed in U.S. Pat. Nos. 4,583,825 and 5,410,422. Since rod-like liquid crystal molecules in upper part and ones in lower part are symmetrically aligned, the liquid crystal cell of bend alignment mode has self-optical compensatory function. Therefore, this mode is referred to as OCB (optically compensatory bend) mode. The liquid crystal display of bend alignment mode has an advantage of responding rapidly.

In a liquid crystal cell of TN mode, rod-like liquid crystal molecules are essentially horizontally aligned while voltage is not applied, and oriented in a twisted alignment with a twisted angle of 60 to 120° C.

The liquid crystal cell of TN mode is widely used in color TFT liquid crystal displays, and hence is described in many publications.

EXAMPLE 1

In a mixed solvent of methyl ethyl ketone/methyl isobutyl ketone (20/80, by weight), 100 weight parts of silica ultrafine particles-containing hard coat liquid (Desolite Z7526, JSR Co., Ltd.; refractive index: 1.51), 25 weight parts of cross-linked polystyrene beads (SX130H, Soken Chemical & Engineering Co., Ltd.; particles size: 1.3 μm; refractive index: 1.61) and 6 weight parts of cross-linked polystyrene beads (SX350H, Soken Chemical & Engineering Co., Ltd.; particles size: 3.5 μm; refractive index: 1.61) were mixed to prepare a solution having the solid content of 45%. The prepared solution was applied on a cellulose triacetate film (TD-80U, Fuji Photo Film Co., Ltd.). The coating amount of the cross-linked polystyrene beads of 1.3 μm was 1.1 g/m². The layer was dried, and then exposed to ultraviolet light (illuminance: 400 mW/cm², exposure: 300 mJ/cm²) emitted from an air-cooled metal halide lamp of 160 W/cm (Eyegraphics Co., Ltd.) to harden the layer. Thus, a diffusion film (A-01) was prepared. The thickness of the layer was 3.5 μm.

EXAMPLE 2

(Preparation of Coating Solution For Low Refractive Index Layer)

Into 93 g of a thermo-cross-linkable fluorine-containing polymer (JN-7228, JSR Co., Ltd.; refractive index: 1.42), 8 g of $SiO_2$ sol dispersed in methyl ethyl ketone (MEK-ST, Nissan Chemicals Co., Ltd.; average particle size: 10–20 nm; solid content: 30 wt. %) and 100 g of methyl ethyl ketone were added and stirred. The obtained liquid was filtrated through a propylene filter (porous size: 1 μm) to prepare a coating solution for low refractive index layer.

The above-prepared coating solution was applied on the diffusion layer of the diffusion film (A-01) by means of a bar coater, dried at 80° C., and further heated at 120° C. for 10 minutes to cause a thermal cross-linking reaction. Thus, a low refractive index layer (thickness: 0.096 μm) was formed to produce a diffusion film (A-02).

EXAMPLE 3

The procedure of Example 2 was repeated except that the amount of the cross-linked polystyrene beads of 1.3 μm were changed into the amounts shown in Table 1, to produce diffusion films (A-03 to A-07).

EXAMPLE 4

The procedure of Example 2 was repeated except that the cross-linked polystyrene beads of 1.3 μm were changed into silica beads of 1.5 μm (Seehostar KE-P150, Nippon Shokubai Co., Ltd.; refractive index: 1.44) in the amounts shown in Table 1, to produce diffusion films (A-08 and A-09).

EXAMPLE 5

With 100 weight parts of zirconium oxide-dispersed hard coat liquid (Desolite KZ-7114A, JSR Co., Ltd.), 57 weight parts of transparent resin (DPHA, Nippon Kayaku Co., Ltd.) was mixed. The mixture was dissolved in a mixed solvent of methyl ethyl ketone/methyl isobutyl ketone (20/80, by weight) with stirring by means of air-disperser. The prepared solution was applied, dried, and then exposed to ultraviolet light to harden the layer. The thus-formed layer had the refractive index of 1.61.

In the above-prepared solution, 17 weight parts of polymethyl methacrylate beads (MX150, Soken Chemical & Engineering Co., Ltd.; particles size: 1.5 μm; refractive index: 1.49) and 7 weight parts of polymethyl methacrylate beads (MX300, Soken Chemical & Engineering Co., Ltd.; particles size: 3.0 μm; refractive index: 1.49) were mixed and dispersed. The solid content of the solution was adjusted with methyl ethyl ketone/methyl isobutyl ketone (20/80, by weight) to 50%. The prepared solution was applied on a cellulose triacetate film (TD-80U, Fuji Photo Film Co., Ltd.). The coating amount of the polymethyl methacrylate beads of 1.5 μm was 0.4 g/m$^2$. The layer was dried, and then exposed to ultraviolet light (illuminance: 400 mW/cm$^2$, exposure: 300 mJ/cm$^2$) emitted from an air-cooled metal halide lamp of 160 W/cm (Eyegraphics Co., Ltd.) to harden the layer. Thus, a diffusion film (B-01) was prepared. The thickness of the layer was 3.0 μm.

EXAMPLE 6

The above-prepared coating solution was applied on the diffusion layer of the diffusion film (B-01) by means of a wire-bar coater, dried at 80° C., and further heated at 120° C. for 10 minutes to cause a cross-linking reaction. Thus, a low refractive index layer (thickness: 0.096 μm) was formed to produce a diffusion film (B-02).

EXAMPLE 7

The procedure of Example 6 was repeated except that the amount of the polymethyl methacylate beads of 1.5 μm were changed into the amounts shown in Table 2, to produce diffusion films (B-03 to B-06).

EXAMPLE 8

The procedure of Example 6 was repeated except that the polymethyl methacylate beads of 1.5 μm were changed into polymethyl methacylate beads of 5.0 μm, to produce a diffusion film (B-07).

EXAMPLE 9

The procedure of Example 6 was repeated except that the polymethyl methacylate beads of 1.5 μm were changed into cross-linked polystyrene beads of 1.3 μm in the amounts shown in Table 2, to produce diffusion films (B-08 and B-09).

EXAMPLE 10

The procedure of Example 6 was repeated except that the polymethyl methacylate beads of 1.5 μm were changed into melamine-formaldehyde beads (Nippon Shokubai Co., Ltd.; particle size: 0.5 μm; refractive index: 1.68) in the amount shown in Table 2, to produce a diffusion film (B-10).

(Evaluation of Diffusion Film)

The prepared diffusion films were evaluated in the following manner.

(1) Mirror Reflectance

The mirror reflectance of light in the wavelength range of 380 to 780 nm coming at the incident angle of 5° was measured at the reflection angle of −5° by means of a spectrophotometer (V-550, Japan Spectrum Co., Ltd.) equipped with an adaptor ARV-474. The average reflectance in the wavelength range of 450 to 650 nm was calculated to evaluate the function of anti-reflection.

(2) Haze

The haze of the prepared film was measured with a haze meter (MODEL 1001DP, Nippon Denshoku Industries Co., Ltd.).

(3) Scattered Light Profile

The prepared film was placed perpendicularly to incident light, and the scattered light profile was measured in all directions by means of an automatic goniophotometer (GP-5, Murakami Color Research Laboratory). The intensities of scattered light at 30° and 60° based on the intensity of transmitted light at 0° were measured.

Figure 3:
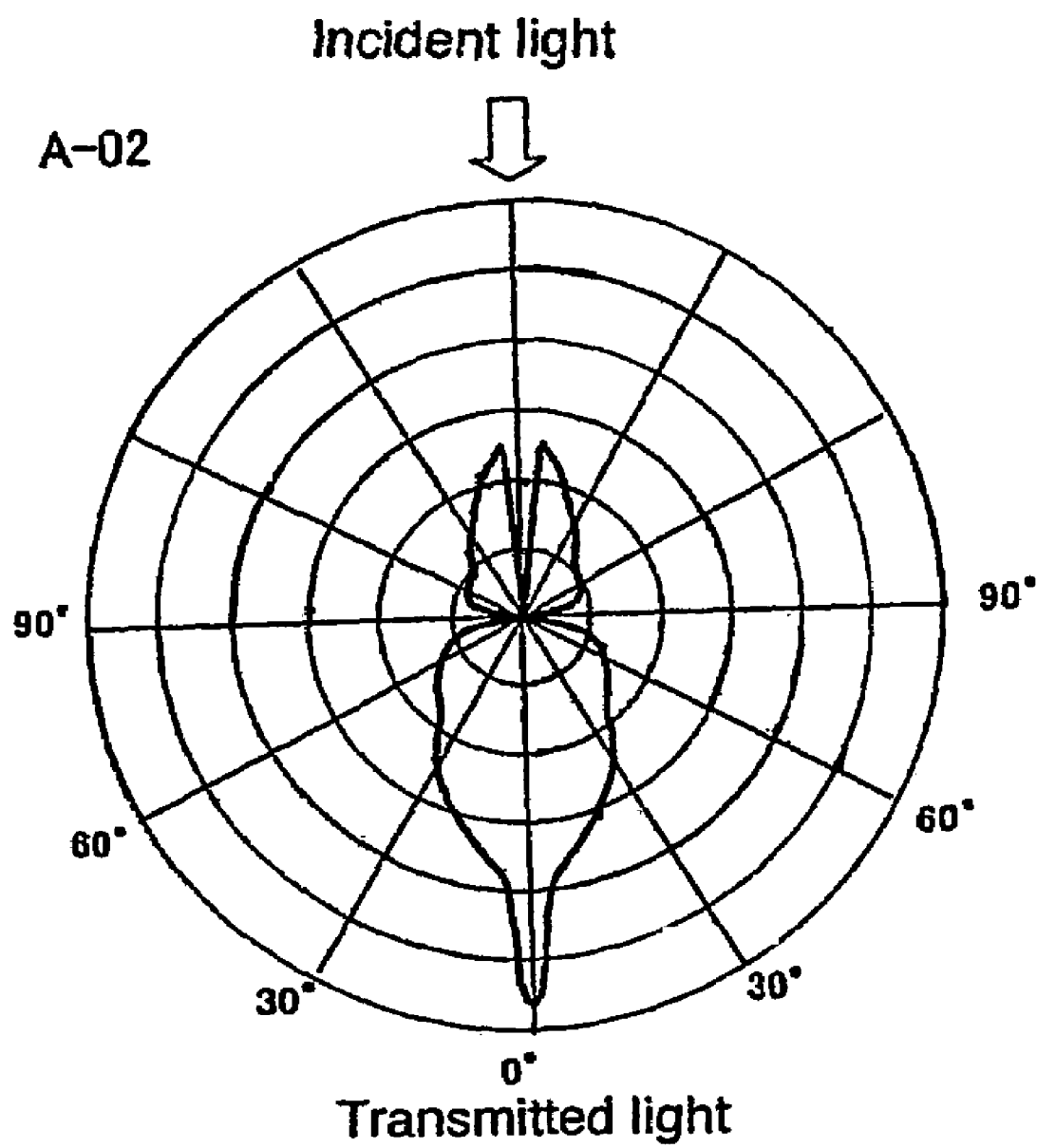
FIG. 3 is a scattered light profile of the diffusion film (A-02) prepared in Example 2.

FIG. 3 shows the scattered light profile of the diffusion film (A-02) prepared in Example 2. The radii of the concentric circles in FIG. 3 are logarithmically graduated.

Polarizing plates comprising the diffusion films prepared in Examples were prepared, and installed in liquid crystal displays to evaluate.

(Preparation of Polarizing Plate on Observer Side)

Iodine was adsorbed on a stretched polyvinyl alcohol film to prepare a polarizing membrane. Each of the films A-01 to A-09 and B-01 to B-10 was saponified, and laminated on one surface of the polarizing membrane with polyvinyl adhesive so that the transparent substrate (cellulose triacetate film) of the diffusion film might be contact with the membrane. A commercially available optical compensatory sheet [WVSA12B, Fuji Photo Film Co., Ltd.] (which has an optically anisotropic layer formed of liquid crystal compound) was also saponified, and laminated on the other surface of the membrane with polyvinyl adhesive so that the support of the sheet might be contact with the membrane. Thus, polarizing plates on observer side (PA-01 to PA-09 and PB-01 to PB-10) were prepared.

(Preparation of Polarizing Plate on Backlight Side)

Iodine was adsorbed on a stretched polyvinyl alcohol film to prepare a polarizing membrane. A commercially available cellulose triacetate film (Fuji Tac TD80, Fuji Photo Film Co., Ltd.) was saponified, and laminated on one surface of the polarizing membrane with polyvinyl adhesive. A commercially available optical compensatory sheet [WVSA12B, Fuji Photo Film Co., Ltd.](which has an optically anisotropic layer formed of liquid crystal compound) was also saponified, and laminated on the other surface of the membrane with polyvinyl adhesive so that the cellulose acetate film might be contact with the membrane. Thus, a polarizing plate on backlight side was prepared.

EXAMPLE 11

A pair of polarizing plates were removed from a commercially available liquid crystal display of TN mode (6E-A3, Sharp Corporation). In place of the removed polarizing plates, each of the polarizing plates (PA-01 to PA-09 and PB-01 to PB-10) was laminated on the observer side surface with adhesive so that the optical compensatory sheet might be on the liquid crystal cell side. On the backlight side, the above-prepared polarizing plate on backlight side was laminated with adhesive so that the optical compensatory sheet might be on the liquid crystal cell side. The polarizing plate on the observer side and that on the backlight side were placed so that the transparent axes of the observer side plate and the backlight side plate might be arranged in 0 mode. Thus, the liquid crystal display was prepared.

The viewing angle of the prepared liquid crystal display was measured by means of a measuring apparatus (EZ-Contrast 160D, ELDIM) when each of the eight tones of black (L1) to white (L8) was displayed. Further, images displayed by the liquid crystal displays are observed and evaluated into the following three grades:

A: no blur is observed,

B: blurs are slightly observed, and

C: blurs are clearly observed.

The results are set forth in Tables 1 and 2.

TABLE 1

| Diffusion film/ Polarizing plate | Internal particles | | | Low refractive index layer | Total haze (%) | Internal haze (%) |
|---|---|---|---|---|---|---|
| | Material | Particle size (μm) | Refractive index | Coating amount (g/m²) | | |
| A-01/PA-01 | PS | 1.3 | 1.61 | 1.1 | – | 54 | 43 |
| A-02/PA-02 | PS | 1.3 | 1.61 | 1.1 | + | 53 | 41 |
| A-03/PA-03 | None | — | — | 0 | + | 26 | 8 |
| A-04/PA-04 | PS | 1.3 | 1.61 | 0.2 | + | 28 | 15 |
| A-05/PA-05 | PS | 1.3 | 1.61 | 0.6 | + | 42 | 32 |
| A-06/PA-06 | PS | 1.3 | 1.61 | 2.0 | + | 64 | 54 |
| A-07/PA-07 | PS | 1.3 | 1.61 | 8.0 | + | 92 | 83 |
| A-08/PA-08 | Silica | 1.5 | 1.44 | 0.6 | + | 31 | 20 |
| A-09/PA-09 | Silica | 1.5 | 1.44 | 2.0 | + | 50 | 37 |

(Remark)
PS: Cross-linked polystyrene

| Diffusion film/ Polarizing plate | Mirror reflectance (%) | Grade of image | Intensity ratio | | Viewing angle | | |
|---|---|---|---|---|---|---|---|
| | | | 30°/0° (%) | 60°/0° (%) | Up | Down | R-L |
| A-01/PA-01 | 3.8 | A | 0.080 | 0.0055 | 80° | 56° | 160° |
| A-02/PA-02 | 1.8 | A | 0.080 | 0.0050 | 80° | 55° | 160° |
| A-03/PA-03 | 1.6 | A | 0.001 | 0.0001 | 68° | 40° | 130° |
| A-04/PA-04 | 1.6 | A | 0.005 | 0.0003 | 70° | 42° | 133° |
| A-05/PA-05 | 1.7 | A | 0.020 | 0.0020 | 80° | 50° | 150° |
| A-06/PA-06 | 1.9 | B | 0.170 | 0.0150 | 80° | 63° | 160° |
| A-07/PA-07 | 2.1 | C | 0.250 | 0.0300 | 80° | 75° | 160° |
| A-08/PA-08 | 1.5 | C | 0.007 | 0.0005 | 70° | 41° | 132° |
| A-09/PA-09 | 1.7 | A | 0.060 | 0.0040 | 80° | 56° | 160° |

(Remark)
Intensity ratio: Ratio of intensity of scattered light to intensity of transmitted light
Viewing angle: An angle giving a contrast ratio of 10 or more without tone inversion upward (Up), downward (Down) or rightward-leftward (R-L), wherein tone inversion within the black area means inversion between L2 and L3

TABLE 2

| Diffusion film/ Polarizing plate | Internal particles | | | Low refractive index layer | Total haze (%) | Internal haze (%) |
|---|---|---|---|---|---|---|
| | Material | Particle size (μm) | Refractive index | Coating amount (g/m²) | | |
| B-01/PB-01 | PMMA | 1.5 | 1.49 | 0.4 | – | 52 | 41 |
| B-02/PB-02 | PMMA | 1.5 | 1.49 | 0.4 | + | 50 | 41 |
| B-03/PB-03 | PMMA | 1.5 | 1.49 | 0.1 | + | 24 | 16 |
| B-04/PB-04 | PMMA | 1.5 | 1.49 | 0.2 | + | 38 | 30 |
| B-05/PB-05 | PMMA | 1.5 | 1.49 | 0.8 | + | 66 | 54 |
| B-06/PB-06 | PMMA | 1.5 | 1.49 | 3.0 | + | 89 | 78 |
| B-07/PB-07 | PMMA | 5.0 | 1.49 | 0.4 | + | 31 | 23 |
| B-08/PB-08 | PS | 1.3 | 1.61 | 0.4 | + | 19 | 10 |
| B-09/PB-09 | PS | 1.3 | 1.61 | 0.8 | + | 22 | 14 |
| B-10/PB-10 | MF | 0.5 | 1.68 | 0.8 | + | 45 | 36 |

(Remark)
PMMA: Polymethyl methacrylate
PS: Cross-linked polystyrene
MF: Melamine formaldehyde resin

| Diffusion film/ Polarizing plate | Mirror reflectance (%) | Grade of image | Intensity ratio | | Viewing angle | | |
|---|---|---|---|---|---|---|---|
| | | | 30°/0° (%) | 60°/0° (%) | Up | Down | R-L |
| B-01/PB-01 | 5.4 | A | 0.060 | 0.0030 | 80° | 55° | 160° |
| B-02/PB-02 | 1.1 | A | 0.060 | 0.0030 | 80° | 57° | 160° |
| B-03/PB-03 | 1.1 | A | 0.007 | 0.0005 | 70° | 43° | 132° |
| B-04/PB-04 | 1.2 | A | 0.030 | 0.0020 | 80° | 52° | 160° |
| B-05/PB-05 | 1.1 | B | 0.090 | 0.0100 | 80° | 65° | 160° |
| B-06/PB-06 | 1.2 | C | 0.300 | 0.0280 | 80° | 78° | 160° |
| B-07/PB-07 | 1.3 | A | 0.004 | 0.0003 | 71° | 42° | 133° |
| B-08/PB-08 | 1.0 | A | 0.001 | 0.0001 | 69° | 40° | 130° |
| B-09/PB-09 | 1.0 | A | 0.001 | 0.0001 | 68° | 40° | 130° |
| B-10/PB-10 | 1.3 | A | 0.030 | 0.0090 | 80° | 50° | 150° |

(Remark)
Intensity ratio: Ratio of intensity of scattered light to intensity of transmitted light
Viewing angle: An angle giving a contrast ratio of 10 or more without tone inversion upward (Up), downward (Down) or rightward-leftward (R-L), wherein tone inversion within the black area means inversion between L2 and L3

The results shown in Tables 1 and 2 indicate that the diffusion films giving the scattered light intensity ratios of 30°/0° in the range of not less than 0.01% remarkably improve the viewing angle characters of liquid crystal display when used as the polarizing plates provided on the display. Particularly, they improve the viewing angle characters when the display is seen downward and right-leftward. On the other hand, however, if the ratio of 30°/0° is more than 0.2%, the resultant image is blurred although the viewing angle is considerably enlarged. Accordingly, the diffusion films giving the scattered light intensity ratios of 30°0/0° in the range of 0.01 to 0.2% remarkably improve the viewing angle characters without blurring the displayed images.

EXAMPLE 12

In a mixed solvent of methyl ethyl ketone/methyl isobutyl ketone (20/80, by weight), 100 weight parts of silica ultrafine particles-containing hard coat liquid (Desolite Z7526, JSR Co., Ltd.; refractive index: 1.51), 33 weight parts of cross-linked polystyrene beads (SX130H, Soken Chemical & Engineering Co., Ltd.; particles size: 1.3 μm; refractive index: 1.61) and 11 weight parts of cross-linked polystyrene beads (SX350H, Soken Chemical & Engineering Co., Ltd.; particles size: 3.5 μm; refractive index: 1.61)

were mixed and dispersed to prepare a solution having the solid content of 50%. The prepared solution was applied on a cellulose triacetate film (TD-80U, Fuji Photo Film Co., Ltd.), and dried. The dry thickness of the layer was 4.0 µm. The layer was exposed to ultraviolet light (illuminance: 400 mW/cm$^2$, exposure: 300 mJ/cm$^2$) emitted from an air-cooled metal halide lamp of 160 W/cm (Eyegraphics Co., Ltd.) to harden the layer. Thus, a diffusion film (HKF-01) was prepared.

The haze of the prepared film HKF-01 was measured with a haze meter (MODEL 1001DP, Nippon Denshoku Industries Co., Ltd.). As a result, the haze value was 55%.

The surface roughness of the film was 0.16 µm. The angular distribution from the surface of the layer was measured by using Surface Explore SX-520. As a result, the average of the angular distribution was 4.0°, and the maximum peak of the angular distribution was 1.0°.

EXAMPLE 13

With 100 weight parts of zirconium oxide-dispersed hard coat liquid (Desolite KZ-7114A, JSR Co., Ltd.), 43 weight parts of transparent resin (DPHA, Nippon Kayaku Co., Ltd.) and 5 weight parts of a hardening initiator (Irgacure 184, Ciba-Geigy) were mixed. The mixture was dissolved in a mixed solvent of methyl ethyl ketone/methyl isobutyl ketone (20/80, by weight) with stirring by means of air-disperser. The prepared solution was applied, dried, and then exposed to ultraviolet light to harden the layer. The thus-formed layer had the refractive index of 1.64.

In the above-prepared solution, 21 weight parts of polymethyl methacrylate beads (MX150, Soken Chemical & Engineering Co., Ltd.; particles size: 1.5 µm; refractive index: 1.49) and 8.5 weight parts of polymethyl methacrylate beads (MX300, Soken Chemical & Engineering Co., Ltd.; particles size: 3.0 µm; refractive index: 1.49) were mixed and dispersed. The solid content of the solution was adjusted with methyl ethyl ketone/methyl isobutyl ketone (20/80, by weight) to 53%. The prepared solution was applied on a cellulose triacetate film (TD-80U, Fuji Photo Film Co., Ltd.). The coated layer was dried. The dry thickness of the layer was 2.7 µm. The layer was exposed to ultraviolet light (illuminance: 400 mW/cm$^2$, exposure: 300 mJ/cm2) emitted from an air-cooled metal halide lamp of 160 W/cm (Eyegraphics Co., Ltd.) to harden the layer. Thus, a diffusion film (HKF-02) was prepared.

The haze of the prepared film HKF-02 was measured with a haze meter (MODEL 1001DP, Nippon Denshoku Industries Co., Ltd.). As a result, the haze value was 63%.

The surface roughness of the film was 0.15 µm. The angular distribution from the surface of the layer was measured by using Surface Explore SX-520. As a result, the average of the angular distribution was 3.5°, and the maximum peak of the angular distribution was 1.0°.

EXAMPLE 14

(Preparation of Coating Solution For Low Refractive Index Layer)

Into 93 g of a thermo-cross-linkable fluorine-containing polymer (JN-7228, JSR Co., Ltd.; refractive index: 1.42), 8 g of SiO$_2$ sol dispersed in methyl ethyl ketone (MEK-ST, Nissan Chemicals Co., Ltd.; solid content: 30 wt. %) and 100 g of methyl ethyl ketone were added and stirred. The obtained liquid was filtrated through a propylene filter (porous size: 1 µm) to prepare a coating solution for low refractive index layer.

The above-prepared coating solution was applied on the diffusion layer of the diffusion film (HKF-01) by means of a bar coater, dried at 80° C., and further heated at 120° C. for 10 minutes to cause a thermal cross-linking reaction. Thus, a low refractive index layer (thickness: 0.096 µm) was formed to produce a diffusion film (HKHB-01).

EXAMPLE 15

The coating solution prepared in Example 14 was applied on the diffusion layer of the diffusion film (HKF-02) by means of a bar coater, dried at 80° C., and further heated at 120° C. for 10 minutes to cause a thermal cross-linking reaction. Thus, a low refractive index layer (thickness: 0.096 µm) was formed to produce a diffusion film (HKHB-02).

COMPARATIVE EXAMPLE 1

In a mixed solvent of methyl ethyl ketone/acetone (40/60, by weight), 100 weight parts of silica ultrafine particles-containing hard coat liquid (Desolite Z7526, JSR Co., Ltd.; refractive index: 1.51), 12 weight parts of benzoguanamine-melamine formaldehyde resin beads (Nippon Shokubai Co., Ltd.; particles size: 0.5 µm; refractive index: 1.68) and 11 weight parts of cross-linked polystyrene beads (SX350H, Soken Chemical & Engineering Co., Ltd.; particles size: 3.5 µm; refractive index: 1.61) were mixed and dispersed to prepare a solution having the solid content of 50%. The prepared solution was applied on a cellulose triacetate film (TD-80U, Fuji Photo Film Co., Ltd.), and dried. The dry thickness of the layer was 3.0 µm. The layer was exposed to ultraviolet light (illuminance: 400 mW/cm$^2$, exposure: 300 mJ/cm$^2$) emitted from an air-cooled metal halide lamp of 160 W/cm (Eyegraphics Co., Ltd.) to harden the layer. Thus, a diffusion film (HKF-H1) was prepared.

The haze of the prepared film HKF-01 was measured with a haze meter (MODEL 1001DP, Nippon Denshoku Industries Co., Ltd.). As a result, the haze value was 50%.

The surface roughness of the film was 0.35 µm. The angular distribution from the surface of the layer was measured by using Surface Explore SX-520. As a result, the average of the angular distribution was 6.5°, and the maximum peak of the angular distribution was 1.6°.

(Evaluation of Diffusion Film)

The prepared diffusion films were evaluated in the following manner.

(0) Scattered Light Profile

The prepared film was placed perpendicularly to incident light, and the scattered light profile was measured in all directions by means of an automatic goniophotometer (GP-5, Murakami Color Research Laboratory). The intensities of scattered light at 30° and 60° based on the intensity of reflected light at 0° were measured.

(1) Mirror Reflectance and Chromaticity

The mirror reflectance of light in the wavelength range of 380 to 780 nm coming at the incident angle of 5° was measured at the reflection angle of −5° by means of a spectrophotometer (V-550, Japan Spectrum Co., Ltd.) equipped with an adaptor ARV-474. The average reflectance in the wavelength range of 450 to 650 nm was calculated to evaluate the function of anti-reflection.

(2) Haze

The haze of the prepared film was measured with a haze meter (MODEL 1001DP, Nippon Denshoku Industries Co., Ltd.).

(3) Pencil Hardness

The pencil hardness was measured according to JIS-K-5400 to evaluate resistance to scratching. The diffusion film was conditioned at the temperature of 25° C. and the relative humidity of 60% for 2 hours. The film was evaluated by using a test pencil of 3H according to JIS-S-6006 with a weight of 1 kg, and classified into the following three grades.

A: No scratch was observed where the test was repeated five times.

B: One or two scratches were observed where the test was repeated five times.

C: Three or more scratches were observed where the test was repeated five times.

(4) Contact Angle of Water

The diffusion film was conditioned at the temperature of 25° C. and the relative humidity of 60% for 2 hours. The contact angle of water on the film was measured to evaluate surface resistance to contamination (finger print).

(5) Dynamic Friction

The dynamic friction of the film was measured to evaluate surface smoothness. The diffusion film was conditioned at the temperature of 25° C. and the relative humidity of 60% for 2 hours. The film was measured by using stainless balls of 5 mmϕ with weight of 100 g at the speed of 60 cm per minute in a measuring device for dynamic friction (HEIDON-14).

(6) Anti-Glare Function

Light of a naked (no louver) fluorescent lamp ($1\times10^{12}$ Ω per square) was reflected on the diffusion film. The reflected image was evaluated into the following four grades.

A: The outline of the fluorescent lamp was not recognized at all.

B: The outline of the fluorescent lamp was slightly recognized.

C: The image of the fluorescent lamp was vague, but the outline was recognized.

D: The image was not value.

(7) Surface Resistance

The surface resistance was measured according to a disk electrode method. As a result, each of the samples shows a surface resistance of $1\times10^{12}$ Ω per square or more.

(8) Vertical Peeling Static Charge

The vertical peeling static charge of the diffusion film to cellulose triacetate (TAC) was measured as is described above.

(9) Resistance to Dust

The diffusion film was attached to a glass plate, and discharged. The film was rubbed back and fourth ten times with a cloth cleaner (TORAYSEE, Toray Co., Ltd.). Fine foamed polystyrene powder was used as fake dust, and sprinkled over the film. The film was stood up, and dropping powder was observed and evaluated into the following four grades.

A: Almost all powder was dropped.

B: 80% or more powder was dropped.

C: 50% or more powder was dropped.

D: 50% or more powder remains on the film surface.

The results are set forth in Table 3.

TABLE 3

| Diffusion film | Intensity ratio | | Haze (%) | Angular distribution | | Surface roughness (μm) |
|---|---|---|---|---|---|---|
| | 30°/0° (%) | 60°/0° (%) | | Average | Peak | |
| Example 14 | 0.085 | 0.0060 | 55 | 4.0° | 1.0° | 0.16 |
| Example 15 | 0.095 | 0.0090 | 63 | 3.5° | 1.0° | 0.15 |
| Comp. Ex. 1 | 0.060 | 0.0040 | 50 | 6.5° | 1.6° | 0.35 |

(Remark)
Intensity ratio: Ratio of intensity of scattered light to intensity of transmitted light

| Diffusion film | Vertical peeling static charge | Resistance to dust | Mirror reflectance | Anti-glare function | Dynamic friction | Contact angle |
|---|---|---|---|---|---|---|
| Example 14 | +50 pc | A | 1.8% | A | 0.08 | 103° |
| Example 15 | −50 pc | A | 1.1% | A | 0.08 | 103° |
| Comp. Ex. 1 | −500 pc | D | 4.0% | C | — | — |

The diffusion films according to the present invention are improved in the anti-glare function and the anti-reflective function. Further, the films according to the invention are also improved in the pencil hardness, resistance to fingerprint (contact angle) and the surface smoothness (dynamic friction). Furthermore, the change of the chromaticity was small in the films according to the present invention. On the other hand, the comparative sample (having no low refractive index layer) does not show a sufficient anti-reflective function.

EXAMPLE 16

(Preparation of Polarizing Plate of Viewing Side SHB-01)

Iodine was adsorbed on a stretched polyvinyl alcohol film to prepare a polarizing membrane.

The film HKHB-01 was subjected to a saponification treatment, and the transparent substrate (cellulose triacetate film) of the film HKHB-01 was attached to a surface of the polarizing membrane by using a polyvinyl alcohol adhesive.

An optical compensatory sheet having an optically anisotropic layer containing discotic compound (WVSA12B, Fuji Photo Film Co., Ltd.) was subjected to a saponification treatment. The transparent film support of the optical compensatory sheet was attached to the other surface of the polarizing membrane by using a polyvinyl alcohol adhesive.

Thus a polarizing plate of viewing side (SHB-01) was prepared.

(Preparation of Polarizing Plate of Backlight Side BHB-01)

Iodine was adsorbed on a stretched polyvinyl alcohol film to prepare a polarizing membrane.

A commercially available cellulose triacetate film (Fuji TAC TD80, Fuji Photo Film Co., Ltd.) was subjected to a saponification treatment, and the film was attached to a surface of the polarizing membrane by using a polyvinyl alcohol adhesive.

An optical compensatory sheet having an optically anisotropic layer containing discotic compound (WVSA12B, Fuji Photo Film Co., Ltd.) was subjected to a saponification treatment. The transparent film support of the optical compensatory sheet was attached to the other surface of the polarizing membrane by using a polyvinyl alcohol adhesive.

Thus a polarizing plate of backlight side (BHB-01) was prepared.

(Preparation of Liquid Crystal Display)

Pair of polarizing plates was removed from a liquid crystal display having a liquid crystal cell of a TN mode (6E-A3, Sharp Co., Ltd.). The optical compensatory sheet of the polarizing plate (SHB-01) was attached to the viewing side of the liquid crystal cell of the display by using an adhesive. The optical compensatory sheet of the polarizing plate (BHB-01) was attached to the backlight side of the liquid crystal cell of the display by using an adhesive. The transmission axis of the polarizing plate of the viewing side and the transmission axis of the polarizing plate of the backlight side were arranged according to O mode.

The prepared liquid crystal display was evaluated by using a measuring machine (EZ-Contrast 160D, ELDIM) to measure the viewing angle at the eight levels of black (L1) to while (L8) and the change of chromaticity at the middle level (L3). The results are set forth in Table 4.

EXAMPLE 17

(Preparation of Polarizing Plate of Viewing Side SHB-02)

Iodine was adsorbed on a stretched polyvinyl alcohol film to prepare a polarizing membrane.

The film HKHB-02 was subjected to a saponification treatment, and the transparent substrate (cellulose triacetate film) of the film HKHB-02 was attached to a surface of the polarizing membrane by using a polyvinyl alcohol adhesive.

An optical compensatory sheet having an optically anisotropic layer containing discotic compound (WVSA12B, Fuji Photo Film Co., Ltd.) was subjected to a saponification treatment. The transparent film support of the optical compensatory sheet was attached to the other surface of the polarizing membrane by using a polyvinyl alcohol adhesive.

Thus a polarizing plate of viewing side (SHB-02) was prepared.

(Preparation of Liquid Crystal Display)

Pair of polarizing plates was removed from a liquid crystal display having a liquid crystal cell of a TN mode (6E-A3, Sharp Co., Ltd.). The optical compensatory sheet of the polarizing plate (SHB-02) was attached to the viewing side of the liquid crystal cell of the display by using an adhesive. The optical compensatory sheet of the polarizing plate (BHB-01) was attached to the backlight side of the liquid crystal cell of the display by using an adhesive. The transmission axis of the polarizing plate of the viewing side and the transmission axis of the polarizing plate of the backlight side were arranged according to O mode.

The prepared liquid crystal display was evaluated by using a measuring machine (EZ-Contrast 160D, ELDIM) to measure the viewing angle at the eight levels of black (L1) to while (L8) and the change of chromaticity at the middle level (L3). The results are set forth in Table 4.

COMPARATIVE EXAMPLE 2

(Preparation of Liquid Crystal Display)

Pair of polarizing plates was removed from a liquid crystal display having a liquid crystal cell of a TN mode (6E-A3, Sharp Co., Ltd.). In place of the removed plates, commercially available polarizing plates (LL-82-12WNA, SANRITZ). The transmission axis of the polarizing plate of the viewing side and the transmission axis of the polarizing plate of the backlight side were arranged according to O mode.

The prepared liquid crystal display was evaluated by using a measuring machine (EZ-Contrast 160D, ELDIM) to measure the viewing angle at the eight levels of black (L1) to while (L8) and the change of chromaticity at the middle level (L3). The results are set forth in Table 4.

TABLE 4

| Liquid crystal display | Viewing angle | | |
|---|---|---|---|
| | Up | Down | Right-Left |
| Example 16 | 80° | 75° | 160° |
| Example 17 | 75° | 65° | 160° |
| Comparative Example 2 | 30° | 15° | 100° |

(Remark)
Viewing angle: An angle giving a contrast ratio of 10 or more without tone inversion upward (Up), downward (Down) or rightward-leftward (Right-Left), wherein tone inversion within the black area means inversion between L1 and L2

The liquid crystal display using the diffusion film or the polarizing plate according to the present invention is improved in the viewing angle.

EXAMPLE 18

(Preparation of Optically Isotropic Polymer Film)

The following components were placed in a mixing tank, and stirred while heating to prepare a cellulose acetate solution.

Components of Cellulose Acetate Solution

| | |
|---|---|
| Cellulose acetate (acetic acid content: 60.9%) | 100 weight parts |
| Triphenyl phosphate (plasticizer) | 7.8 weight parts |
| Biphenyldiphenyl phosphate (plasticizer) | 3.9 weight parts |
| Methylene chloride (first solvent) | 300 weight parts |
| Methanol (second solvent) | 54 weight parts |
| 1-Butanol (third solvent) | 11 weight parts |

In another mixing tank, 16 weight parts of the following retardation increasing agent, 80 weight parts of methylene chloride and 20 weight parts of methanol were placed. The mixture was stirred while heating to prepare a retardation increasing agent solution.

(Retardation Increasing Agent)

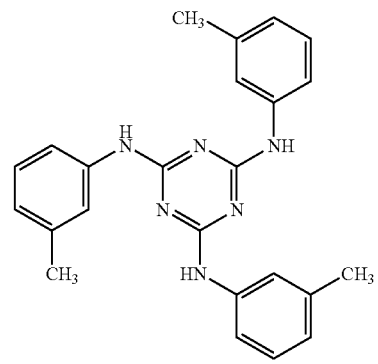

With 484 weight parts of the cellulose acetate solution, 16 weight parts of the retardation increasing agent solution was mixed. The mixture was well stirred to prepare a dope. The amount of the retardation increasing agent was 2.0 weight parts based on 100 weight parts of cellulose acetate.

The prepared dope was cast on a band-casting machine. When the dope on the band was cooled to 40° C., the dope was dried for 1 minute, and then peeled off from the band. The formed film was dried with hot air at 140° C. to prepare a cellulose acetate film (thickness: 80 μm) containing the solvent remaining in the amount of 0.3 wt. %.

The optical characters of the prepared cellulose acetate film (optically anisotropic polymer film) were measured. As a result, the Re retardation value was 5 nm, and the Rth retardation value was 83 nm. The retardation values Re and Rth were measured at the wavelength of 633 nm by using an ellipsometer (M-150, JASCO Corporation).

The cellulose acetate film was immersed in 2.0 N aqueous solution of potassium hydroxide (25° C.) for 2 minutes. The film was neutralized with sulfuric acid, washed with pure water, and dried. The surface energy of the treated film was measured according to the contact angle method to obtain a value of 63 mN/m.

(Formation of Orientation Layer)

The following coating solution was coated on the prepared cellulose acetate film in the amount of 28 ml/m² by using a wire-bar coater of #16. The coated solution was dried with hot air at 60° C. for 60 seconds, and dried with hot air at 90° C. for 150 seconds. The dried layer was subjected to a rubbing treatment along the longitudinal direction of the cellulose acetate film (optically anisotropic polymer film).

Components of Coating Solution for Orientation Layer

| | |
|---|---|
| The following denatured polyvinyl alcohol | 10 weight parts |
| Water | 371 weight parts |
| Methanol | 119 weight parts |
| Glutaraldehyde (cross-linking agent) | 0.5 weight part |

(Denatured Polyvinyl Alcohol)

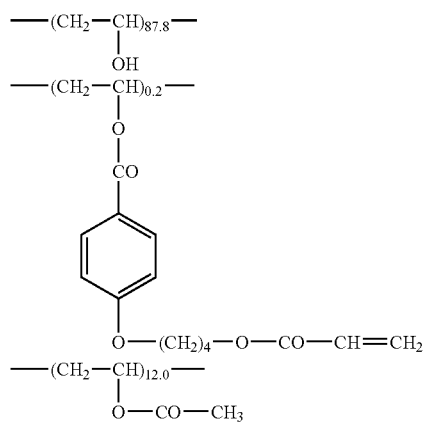

(Formation of Optically Anisotropic Layer)

In 102 g of methyl ethyl ketone, 41.01 g of the following discotic liquid crystal compound, 4.06 g of ethylene oxide denatured trimethylolpropane triacrylate (V#360, Osaka Organic Chemical Industry Ltd.), 0.90 g of cellulose acetate butyrate (CAB-551-0.2, Eastman Chemical), 0.23 g of cellulose acetate butyrate (CAB-531-1, Eastman Chemical), 1.35 g of a photopolymerization initiator (Irgacure 907, Ciba-Geigy) and 0.45 g of a sensitizer (Kayacure DETX, Nippon Kayaku Co., Ltd.) were dissolved to prepare a coating solution. The coating solution was coated on the orientation layer by means of a wire bar of #3.6. The coated film was heated in a thermostat zone at 130° C. for 2 minutes to align the discotic liquid crystal compound. The film was irradiated with an ultraviolet ray emitted from a high pressure mercury lamp of 120 W/cm at 60° C. for 5 seconds to polymerize the discotic liquid crystal molecules. The film was cooled to room temperature. Thus, an optically anisotropic layer was formed.

(Discotic Liquid Crystal Compound)

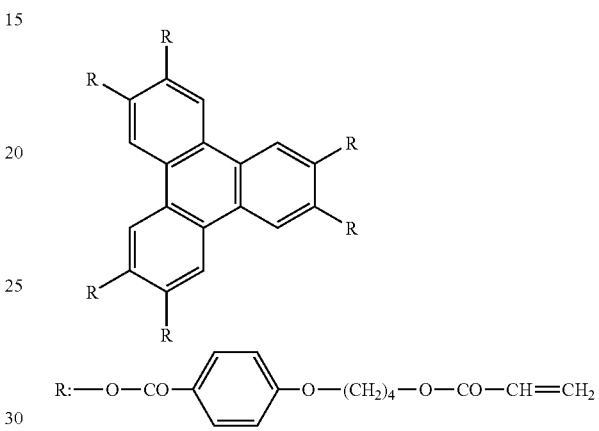

The Re retardation value measured at 546 nm was 43 nm. The angle (inclined angle) between the discotic plane of the discotic liquid crystal compound and the transparent support (optically anisotropic polymer film) was 42° on average.

(Formation of Diffusion Layer)

With 100 weight parts of zirconium oxide-dispersed hard coat liquid (Desolite KZ-7114A, JSR Co., Ltd.), 43 weight parts of transparent resin (DPHA, Nippon Kayaku Co., Ltd.) and 5 weight parts of a hardening initiator (Irgacure 184, Ciba-Geigy) were mixed. The mixture was dissolved in a mixed solvent of methyl ethyl ketone/methyl isobutyl ketone (20/80, by weight) with stirring by means of air-disperser. The prepared solution was applied, dried, and then exposed to ultraviolet light to harden the layer. The thus-formed layer had the refractive index of 1.64.

In the above-prepared solution, 30 weight parts of polymethyl methacrylate beads (MX150, Soken Chemical & Engineering Co., Ltd.; particles size: 1.5 μm; refractive index: 1.53) were mixed and dispersed. The solid content of the solution was adjusted with methyl ethyl ketone/methyl isobutyl ketone (20/80, by weight) to 53%. The prepared solution was applied on the optically anisotropic layer. The coated layer was dried. The dry thickness of the layer was 4.0 μm. The layer was exposed to ultraviolet light (illuminance: 400 mW/cm², exposure: 300 mJ/cm²) emitted from an air-cooled metal halide lamp of 160 W/cm (Eyegraphics Co., Ltd.) to harden the layer. Thus, a diffusion film was prepared.

A diffusion film was prepared in the same manner as is described above except that the solution was applied on a glass plate to measure a haze of the diffusion layer. The haze was measured with a haze meter (MODEL 1001DP, Nippon Denshoku Industries Co., Ltd.) at an inclined angle of 30° (from normal line of the film surface) according to JIS-K-7105. As a result, the haze was 59%.

The prepared film was placed perpendicularly to incident light, and the scattered light profile was measured in all directions by means of an automatic goniophotometer (GP-5, Murakami Color Research Laboratory). The intensities of scattered light at 30° and 60° based on the intensity of reflected light at 0° were measured. As a result, the ratio of the intensity of scattered light at an angle of 30° to the intensity of transmitted light at an angle of 0° (30°/0°) was 0.110, and the ratio of the intensity of scattered light at an angle of 30° to the intensity of transmitted light at an angle of 0° (60°/0°) was 0.0100.

(Preparation of Polarizing Plate of Viewing Side)

Iodine was adsorbed on a stretched polyvinyl alcohol film to prepare a polarizing membrane.

The diffusion film was subjected to a saponification treatment, and the cellulose triacetate film (optically anisotropic polymer film) of the diffusion film was attached to a surface of the polarizing membrane by using a polyvinyl alcohol adhesive.

A commercially available anti-reflection film (CV01, Fuji Photo Film Co., Ltd.) was subjected to a saponification treatment. The film support of the anti-reflection was attached to the other surface of the polarizing membrane by using a polyvinyl alcohol adhesive.

Thus a polarizing plate of viewing side was prepared.

(Preparation of Polarizing Plate of Backlight Side)

Iodine was adsorbed on a stretched polyvinyl alcohol film to prepare a polarizing membrane.

A commercially available cellulose triacetate film (Fuji TAC TD80, Fuji Photo Film Co., Ltd.) was subjected to a saponification treatment, and the film was attached to a surface of the polarizing membrane by using a polyvinyl alcohol adhesive.

An optically anisotropic layer was formed on the cellulose acetate film (optically anisotropic polymer film) as is mentioned above. The lamination of the layer and the film was subjected to a saponification treatment. The cellulose acetate film of the lamination was attached to the other surface of the polarizing membrane by using a polyvinyl alcohol adhesive.

Thus a polarizing plate of backlight side was prepared.

(Preparation of Liquid Crystal Display)

Pair of polarizing plates was removed from a liquid crystal display having a liquid crystal cell of a TN mode (6E-A3, Sharp Co., Ltd.). The optically anisotropic layer of the polarizing plate of viewing side was attached to the viewing side of the liquid crystal cell of the display by using an adhesive. The optically anisotropic layer of the polarizing plate of the backlight side was attached to the backlight side of the liquid crystal cell of the display by using an adhesive. The transmission axis of the polarizing plate of the viewing side and the transmission axis of the polarizing plate of the backlight side were arranged according to O mode.

The prepared liquid crystal display was evaluated by using a measuring machine (EZ-Contrast 160D, ELDIM) to measure the viewing angle at the eight levels of black (L1) to while (L8) and the change of chromaticity at the middle level (L3). The results are set forth in Table 5.

COMPARATIVE EXAMPLE 3

(Preparation of Polarizing Plate of Viewing Side)

Iodine was adsorbed on a stretched polyvinyl alcohol film to prepare a polarizing membrane.

An optically anisotropic layer was formed on the cellulose acetate film (optically anisotropic polymer film) in the same manner as in Example 18. The lamination of the layer and the film was subjected to a saponification treatment, and the cellulose triacetate film (optically anisotropic polymer film) of the lamination was attached to a surface of the polarizing membrane by using a polyvinyl alcohol adhesive.

A commercially available anti-reflection film (CV01, Fuji Photo Film Co., Ltd.) was subjected to a saponification treatment. The film support of the anti-reflection was attached to the other surface of the polarizing membrane by using a polyvinyl alcohol adhesive.

Thus a polarizing plate of viewing side was prepared.

(Preparation of Liquid Crystal Display)

Pair of polarizing plates was removed from a liquid crystal display having a liquid crystal cell of a TN mode (6E-A3, Sharp Co., Ltd.). The optically anisotropic layer of the polarizing plate of viewing side was attached to the viewing side of the liquid crystal cell of the display by using an adhesive. The optically anisotropic layer of the polarizing plate of the backlight side prepared in Example 18 was attached to the backlight side of the liquid crystal cell of the display by using an adhesive. The transmission axis of the polarizing plate of the viewing side and the transmission axis of the polarizing plate of the backlight side were arranged according to O mode.

The prepared liquid crystal display was evaluated by using a measuring machine (EZ-Contrast 160D, ELDIM) to measure the viewing angle at the eight levels of black (L1) to while (L8) and the change of chromaticity at the middle level (L3). The results are set forth in Table 5.

TABLE 5

| Liquid crystal dis- | Viewing angle | | |
|---|---|---|---|
| play | Up | Down | Right-Left |
| Example 18 | 80° | 70° | 160° |
| Comparative Example 3 | 80° | 40° | 160° |

(Remark)
Viewing angle: An angle giving a contrast ratio of 10 or more without tone inversion upward (Up), downward (Down) or rightward-leftward (Right-Left), wherein tone inversion within the black area means inversion between L1 and L2

EXAMPLE 19

(Preparation of Optically Isotropic Polymer Film)

The following components were placed in a mixing tank, and stirred while heating to prepare a cellulose acetate solution.

Components of Cellulose Acetate Solution

| | |
|---|---|
| Cellulose acetate (acetic acid content: 60.9%) | 100 weight parts |
| Triphenyl phosphate (plasticizer) | 7.8 weight parts |
| Biphenyldiphenyl phosphate (plasticizer) | 3.9 weight parts |
| Methylene chloride (first solvent) | 300 weight parts |
| Methanol (second solvent) | 45 weight parts |

In another mixing tank, 25 weight parts of the retardation increasing agent used in Example 1, 80 weight parts of methylene chloride and 20 weight parts of methanol were placed. The mixture was stirred while heating to prepare a retardation increasing agent solution.

With 470 weight parts of the cellulose acetate solution, 30 weight parts of the retardation increasing agent solution was mixed. The mixture was well stirred to prepare a dope. The amount of the retardation increasing agent was 6.9 weight parts based on 100 weight parts of cellulose acetate.

The prepared dope was cast on a band-casting machine. When the dope on the band was cooled to 35° C., the dope was dried for 1 minute, and then peeled off from the band. The formed film was stretched at the stretching ratio of 28% along the width direction at 140° C. on a tenter extension zone. The film was dried at 140° C. for 10 minutes and at 130° C. for 20 minutes to prepare a cellulose acetate film (thickness: 60 μm) containing the solvent remaining in the amount of 0.3 wt. %.

The optical characters of the prepared cellulose acetate film (optically anisotropic polymer film) were measured. As a result, the Re retardation value was 35 nm, and the Rth retardation value was 175 nm. The retardation values Re and Rth were measured at the wavelength of 550 nm by using an ellipsometer (M-150, JASCO Corporation).

The cellulose acetate film was subjected to a saponification treatment in the same manner as in Example 18. The surface energy of the treated film was measured according to the contact angle method to obtain a value of 60 mN/m.

(Formation of Orientation Layer)

The orientation layer was formed on the prepared cellulose acetate film in the same manner as in Example 18.

The layer was subjected to a rubbing treatment at the angle of 45° from the longitudinal direction of the cellulose acetate film.

(Formation of Optically Anisotropic Layer)

In 102 g of methyl ethyl ketone, 41.01 g of the discotic liquid crystal compound used in Example 18, 4.06 g of ethylene oxide denatured trimethylolpropane triacrylate (V#360, Osaka Organic Chemical Industry Ltd.), 0.68 g of cellulose acetate butyrate (CAB-551-0.2, Eastman Chemical), 1.35 g of a photopolymerization initiator (Irgacure 907, Ciba-Geigy) and 0.45 g of a sensitizer (Kayacure DETX, Nippon Kayaku Co., Ltd.) were dissolved to prepare a coating solution. The coating solution was coated on the orientation layer by means of a wire bar of #4. The coated film was heated in a thermostat zone at 130° C. for 2 minutes to align the discotic liquid crystal compound. The film was irradiated with an ultraviolet ray emitted from a high pressure mercury lamp of 1200 W/cm at 100° C. for about 0.4 second to polymerize the discotic liquid crystal molecules. The film was cooled to room temperature. Thus, an optically anisotropic layer was formed.

The Re retardation value measured at 550 nm was 42 nm. The angle (inclined angle) between the discotic plane of the discotic liquid crystal compound and the transparent support (optically anisotropic polymer film) was 30° on average.

(Formation of Diffusion Layer)

In a mixed solvent of methyl ethyl ketone/methyl isobutyl ketone (20/80, by weight), 100 weight parts of silica ultrafine particles-containing hard coat liquid (Desolite Z7526, JSR Co., Ltd.; refractive index: 1.51) and 33 weight parts of cross-linked polystyrene beads (SX130H, Soken Chemical & Engineering Co., Ltd.; particles size: 1.3 μm; refractive index: 1.61) were mixed and dispersed to prepare a solution having the solid content of 50%. The prepared solution was applied on the optically anisotropic layer. The coated layer was dried. The dry thickness of the layer was 3.5 μm. The layer was exposed to ultraviolet light (illuminance: 400 mW/cm$^2$, exposure: 300 mJ/cm2) emitted from an air-cooled metal halide lamp of 160 W/cm (Eyegraphics Co., Ltd.) to harden the layer. Thus, a diffusion film was prepared.

A diffusion film was prepared in the same manner as is described above except that the solution was applied on a glass plate to measure a haze of the diffusion layer. The haze was measured with a haze meter (MODEL 1001DP, Nippon Denshoku Industries Co., Ltd.) at an inclined angle of 30° (from normal line of the film surface) according to JIS-K-7105. As a result, the haze was 55%.

The surface roughness of the film was 0.16 μm. The angular distribution from the surface of the layer was measured by using Surface Explore SX-520. As a result, the average of the angular distribution was 4.0°, and the maximum peak of the angular distribution was 1.0°.

The prepared film was placed perpendicularly to incident light, and the scattered light profile was measured in all directions by means of an automatic goniophotometer (GP-5, Murakami Color Research Laboratory). The intensities of scattered light at 30° and 60° based on the intensity of reflected light at 0° were measured. As a result, the ratio of the intensity of scattered light at an angle of 30° to the intensity of transmitted light at an angle of 0° (30°/0°) was 0.095, and the ratio of the intensity of scattered light at an angle of 30° to the intensity of transmitted light at an angle of 0° (60°/0°) was 0.0065.

(Preparation of Polarizing Plate of Viewing Side)

Iodine was adsorbed on a stretched polyvinyl alcohol film to prepare a polarizing membrane.

The diffusion film was subjected to a saponification treatment, and the cellulose triacetate film (optically anisotropic polymer film) of the diffusion film was attached to a surface of the polarizing membrane by using a polyvinyl alcohol adhesive.

A commercially available anti-reflection film (CV01, Fuji Photo Film Co., Ltd.) was subjected to a saponification treatment. The film support of the anti-reflection was attached to the other surface of the polarizing membrane by using a polyvinyl alcohol adhesive.

Thus a polarizing plate of viewing side was prepared.

(Preparation of Polarizing Plate of Backlight Side)

Iodine was adsorbed on a stretched polyvinyl alcohol film to prepare a polarizing membrane.

A commercially available cellulose triacetate film (Fuji TAC TD80, Fuji Photo Film Co., Ltd.) was subjected to a saponification treatment, and the film was attached to a surface of the polarizing membrane by using a polyvinyl alcohol adhesive.

An optically anisotropic layer was formed on the cellulose acetate film (optically anisotropic polymer film) as is mentioned above. The lamination of the layer and the film was subjected to a saponification treatment. The cellulose acetate film of the lamination was attached to the other surface of the polarizing membrane by using a polyvinyl alcohol adhesive.

Thus a polarizing plate of backlight side was prepared.

(Preparation of Liquid Crystal Cell of Bend Alignment Mode)

A polyimide membrane was formed on a glass plate having a transparent electrode. The polyimide membrane was subjected to a rubbing treatment to form an orientation layer. The obtained two substrates were so arranged that the orientation layers were facing with each other and the rubbing directions were parallel. The cell gap was adjusted to 6 μm. A liquid crystal compound having a Δn of 0.1396

(ZLI1132, Merck) was inserted into the cell gap to prepare a liquid crystal cell of a bend alignment mode.

(Preparation of Liquid Crystal Display)

The optically anisotropic layer of the polarizing plate of viewing side was attached to the viewing side of the liquid crystal cell of the bend alignment mode by using an adhesive. The optically anisotropic layer of the polarizing plate of the backlight side was attached to the backlight side of the liquid crystal cell by using an adhesive. The rubbing direction of the liquid crystal cell was antiparallel to the rubbing direction of the neighboring polarizing plate.

A square voltage of 55 Hz was applied to the liquid crystal cell. A image was displayed according to a normally white mode of 2V (white) and 5 V (black).

The displayed image was evaluated by using a measuring machine (EZ-Contrast 160D, ELDIM) to measure the viewing angle at the eight levels of black (L1) to while (L8). The contrast ratio was evaluated as the ratio of transparency (white/black). The results are set forth in Table 6.

TABLE 6

| Liquid crystal dis- | Viewing angle | | |
|---|---|---|---|
| play | Up | Down | Right-Left |
| Example 19 | 80° | 80° | 160° |

(Remark)
Viewing angle: An angle giving a contrast ratio of 10 or more without tone inversion upward (Up), downward (Down) or rightward-leftward (Right-Left), wherein tone inversion within the black area means inversion between L1 and L2

EXAMPLE 20

(Formation of Diffusion Layer)

With 100 weight parts of zirconium oxide-dispersed hard coat liquid (Desolite KZ-7114A, JSR Co., Ltd.), 43 weight parts of transparent resin (DPHA, Nippon Kayaku Co., Ltd.) and 5 weight parts of hardening initiator (Irgacure 184, Ciba-Geigy) were mixed. The mixture was dissolved in a mixed solvent of methyl ethyl ketone/methyl isobutyl ketone (20/80, by weight) with stirring by means of air-disperser. The prepared solution was applied, dried, and then exposed to ultraviolet light to harden the layer. The thus-formed layer had the refractive index of 1.64.

In the above-prepared solution, 35 weight parts of polymethyl methacrylate beads (MX150, Soken Chemical & Engineering Co., Ltd.; particles size: 1.5 μm; refractive index: 1.53) were mixed and dispersed. The solid content of the solution was adjusted with methyl ethyl ketone/methyl isobutyl ketone (20/80, by weight) to 53%.

The prepared solution was applied on the optically anisotropic layer prepared in Example 19, and dried. The dry thickness of the layer was 4.0 μm. The layer was exposed to ultraviolet light (illuminance: 400 mW/cm$^2$, exposure: 300 mJ/cm$^2$) emitted from an air-cooled metal halide lamp of 160 W/cm (Eyegraphics Co., Ltd.) to harden the layer. Thus, a diffusion film was prepared.

A diffusion film was prepared in the same manner as is described above except that the solution was applied on a glass plate to measure a haze of the diffusion layer. The haze was measured with a haze meter (MODEL 1001DP, Nippon Denshoku Industries Co., Ltd.) at an inclined angle of 30° (from normal line of the film surface) according to JIS-K-7105. As a result, the haze was 63%.

The prepared film was placed perpendicularly to incident light, and the scattered light profile was measured in all directions by means of an automatic goniophotometer (GP-5, Murakami Color Research Laboratory). The intensities of scattered light at 30° and 60° based on the intensity of reflected light at 0° were measured. As a result, the ratio of the intensity of scattered light at an angle of 30° to the intensity of transmitted light at an angle of 0° (30°/0°) was 0.120, and the ratio of the intensity of scattered light at an angle of 30° to the intensity of transmitted light at an angle of 0° (60°/0°) was 0.0110.

(Preparation of Polarizing Plate of Viewing Side)

Iodine was adsorbed on a stretched polyvinyl alcohol film to prepare a polarizing membrane.

The diffusion film was subjected to a saponification treatment, and the cellulose triacetate film (optically anisotropic polymer film) of the diffusion film was attached to a surface of the polarizing membrane by using a polyvinyl alcohol adhesive.

A commercially available anti-reflection film (CV01, Fuji Photo Film Co., Ltd.) was subjected to a saponification treatment. The film support of the anti-reflection was attached to the other surface of the polarizing membrane by using a polyvinyl alcohol adhesive.

Thus a polarizing plate of viewing side was prepared.

(Preparation of Polarizing Plate of Backlight Side)

Iodine was adsorbed on a stretched polyvinyl alcohol film to prepare a polarizing membrane.

A commercially available cellulose triacetate film (Fuji TAC TD80, Fuji Photo Film Co., Ltd.) was subjected to a saponification treatment, and the film was attached to a surface of the polarizing membrane by using a polyvinyl alcohol adhesive.

An optically anisotropic layer was formed on the cellulose acetate film (optically anisotropic polymer film) in the same manner as in Example 19. The lamination of the layer and the film was subjected to a saponification treatment. The cellulose acetate film of the lamination was attached to the other surface of the polarizing membrane by using a polyvinyl alcohol adhesive.

Thus a polarizing plate of backlight side was prepared.

(Preparation of Liquid Crystal Display)

Pair of polarizing plates was removed from a liquid crystal display having a liquid crystal cell of a vertical alignment mode (VL-1530, Fujitsu Limited). The optically anisotropic layer of the polarizing plate of viewing side was attached to the viewing side of the liquid crystal cell of the display by using an adhesive. The optically anisotropic layer of the polarizing plate of the backlight side was attached to the backlight side of the liquid crystal cell of the display by using an adhesive. The transmission axis of the polarizing plate of the viewing side was arranged along the upward and downward direction, and the transmission axis of the polarizing plate of the backlight side were arranged along the leftward and rightward direction according to a crossed Nicols arrangement.

The prepared liquid crystal display was evaluated by using a measuring machine (EZ-Contrast 160D, ELDIM) to measure the viewing angle at the eight levels of black (L1) to while (L8). The results are set forth in Table 7.

TABLE 7

| Liquid crystal display | Contrast ratio ≧ 10 | | Excellent gradation | |
|---|---|---|---|---|
| | Transmission axis | 45° from axis | Transmission axis | 45° from axis |
| Example 20 | >80° | >80° | 51° | 50° |

(Remark)
Excellent gradation: The angle giving the high brightness (L7, L8) at the viewing angle of 20° along the rightward-leftward direction.

The invention claimed is:

1. A diffusion film which comprises a transparent substrate and a diffusion layer, wherein the diffusion layer shows such a scattered light profile measured by a goniophotometer that a ratio of an intensity of scattered light at an angle of 30° to an intensity of transmitted light at an angle of 0° is 0.01 to 0.2%, wherein the diffusion layer shows such a scattered light profile measured by a goniophotometer that a ratio of an intensity of scattered light at an angle of 60° to an intensity of transmitted light at an angle of 0° is not more than 0.02%, and wherein the diffusion layer comprises a transparent resin and transparent fine particles, said transparent fine particles having a refractive index different from a refractive index of said transparent resin.

2. The diffusion film as claimed in claim 1, wherein the diffusion layer has a total haze value in the range of 40 to 90%.

3. The diffusion film as claimed in claim 1, wherein the diffusion layer has an internal diffusing haze value in the range of 30 to 80%.

4. The diffusion film as claimed in claim 1, wherein the diffusion layer has a haze value measured at an angle of 30° in the range of 30 to 95%.

5. The diffusion film as defined in claim 1, wherein the difference in the refractive index between the transparent resin and the transparent fine particles is in the range of 0.02 to 0.20.

6. The diffusion film as defined in claim 1, wherein the fine particles comprise relatively small particles having a particle size in the range of 0.5 to 2.0 μm and relatively large particles having a particle size in the range of 2.5 to 5.0 μm.

7. The diffusion film as defined in claim 1, wherein the diffusion layer has such a rough surface that an average angle in an angular distribution from the surface of the layer is in the range of 1.5 to 5°.

8. The diffusion film as defined in claim 1, wherein the diffusion layer has such a rough surface that the maximum peak angle in an angular distribution from the surface of the layer is in the range of 0.4 to 1.4°.

9. The diffusion film as defined in claim 1, wherein the diffusion layer has such a rough surface that a surface roughness is in the range of 0.05 to 0.18 μm.

10. The diffusion film as defined in claim 1, wherein the transparent substrate is an optically anisotropic polymer film.

11. The diffusion film as defined in claim 10, wherein the optically anisotropic polymer film has a Re retardation value in the range of 0 to 200 nm and a Rth retardation value in the range of 70 to 500 nm.

12. A polarizing plate comprising a pair of protective films and a polarizing membrane provided between the protective films, wherein one of the protective films is the diffusion film defined in claim 1.

13. The polarizing plate as defined in claim 12, wherein the polarizing plate further comprises an optically anisotropic layer formed of a liquid crystal compound, and the plate comprises the diffusion film, the polarizing membrane and the optically anisotropic layer in this order.

14. The polarizing plate as defined in claim 13, wherein the liquid crystal compound is a discotic compound.

15. An image display device having a display surface covered with the diffusion film defined in claim 1.

* * * * *